United States Patent [19]
Irie et al.

[11] Patent Number: 5,742,624
[45] Date of Patent: Apr. 21, 1998

[54] FAULT DETECTING APPARATUS AND METHOD

[75] Inventors: Atsushi Irie; Susumu Ishiguro; Hajime Nishidai; Hiroshi Soma; Naohiro Tabata, all of Kyoto, Japan

[73] Assignee: Omron Corporation, Kyoto, Japan

[21] Appl. No.: 387,846

[22] PCT Filed: Aug. 23, 1993

[86] PCT No.: PCT/JP93/01173

§ 371 Date: Feb. 23, 1995

§ 102(e) Date: Feb. 23, 1995

[87] PCT Pub. No.: WO94/04969

PCT Pub. Date: Mar. 3, 1994

[30] Foreign Application Priority Data

Aug. 24, 1992 [JP] Japan .................................. 4-224118
Oct. 14, 1992 [JP] Japan .................................. 4-275715

[51] Int. Cl.⁶ .......................... G06F 11/00; G08C 25/00; H03M 13/00; H04L 1/00
[52] U.S. Cl. .................................................. 371/48
[58] Field of Search ..................... 371/48; 395/185.01, 395/185.02, 185.03, 185.04

[56] References Cited

U.S. PATENT DOCUMENTS

| | | | |
|---|---|---|---|
| 4,509,110 | 4/1985 | Levesque, Jr. et al. | 364/153 |
| 4,851,985 | 7/1989 | Burror et al. | 364/184 |
| 5,108,181 | 4/1992 | Nakagami | 365/350 |
| 5,331,565 | 7/1994 | Hattori et al. | 364/472 |
| 5,365,432 | 11/1994 | Chand | 364/140 |
| 5,467,355 | 11/1995 | Umeda et al. | 364/571.04 |

FOREIGN PATENT DOCUMENTS

| | | |
|---|---|---|
| 164421 | 12/1985 | European Pat. Off. . |
| 292914 | 11/1988 | European Pat. Off. . |
| 54-102476 | 8/1979 | Japan . |
| 61-59502 | 3/1986 | Japan . |

OTHER PUBLICATIONS

"Industrial Applications Socciety 36th Annual Petroleum and Chemical Industry Conference," The Institute of Electrical and Electronics Engineers Inc., San Diego, CA, Sep. 11–13, 1989 p.1 & Emergency shutdown system, pp. 23–27.

*Primary Examiner*—Phung Chung
*Attorney, Agent, or Firm*—Dickstein Shapiro Morin & Oshinsky LLP

[57] ABSTRACT

A control system for detecting a potentially faulty detector which may be causing faulty actuation of an actuator of a controlled system has an input-signal memory for storing the state of an input signal from the detector, an auxiliary input-signal memory for storing the state of an input signal provided by an auxiliary-signal generator, an arithmetic-logic unit for generating an output signal to be applied to the actuator in accordance with predetermined logic in conformity with the states of the input signals stored in the input-signal memory and auxiliary input-signal memory, and an output-signal memory for storing the state of an output signal generated by the arithmetic-logic unit. An identification code of an abnormal output signal corresponding to the abnormal actuator which is designated, and an input signal that has influenced a logical operation, performed by the arithmetic-logic unit, and which gave rise to the designated abnormal output signal, is extracted. If the extracted input signal is the signal that has been stored in the input-signal memory, an identification code of this input signal is stored in a storage device.

71 Claims, 27 Drawing Sheets

| RELAY NUMBER | CONTACT NUMBER | DEGREE OF PRIORITY |
|---|---|---|
| 110 | 107 | 0.9 |
| 110 | 209 | 0.7 |
| 110 | 013 | 0.5 |

PUSH ↓     POP ↗

| | | |
|---|---|---|
| 110 | 209 | 0.7 |
| 110 | 013 | 0.5 |

| | | |
|---|---|---|
| 205 | 011 | 0.9 |
| 205 | 204 | 0.6 |
| 110 | 209 | 0.7 |
| 110 | 013 | 0.5 |

Fig. 16a

| RULE 1 | IF [FEATURE 2] IS NB AND [FEATURE 4] IS a | THEN DEGREE OF PRIORITY IS PB |
|---|---|---|
| RULE 2 | IF [FEATURE 1] IS J | THEN DEGREE OF PRIORITY IS PB |
| RULE 3 | IF [FEATURE 3] IS A AND [FEATURE 6] IS NB | THEN DEGREE OF PRIORITY IS PB |
| RULE 4 | IF [FEATURE 1] IS N AND [FEATURE 2] IS PB | THEN DEGREE OF PRIORITY IS NB |
| RULE 5 | IF [FEATURE 3] IS O AND [FEATURE 5] IS ZR | THEN DEGREE OF PRIORITY IS NS |
| RULE 6 | IF [FEATURE 4] IS b AND [FEATURE 6] IS PB | THEN DEGREE OF PRIORITY IS NB |
| RULE 7 | IF [FEATURE 5] IS PB AND [FEATURE 6] IS ZR | THEN DEGREE OF PRIORITY IS NS |
| RULE 8 | IF [FEATURE 2] IS NB AND [FEATURE 5] IS NB | THEN DEGREE OF PRIORITY IS PS |
| ⋮ | ⋮ | ⋮ |

Fig. 16b

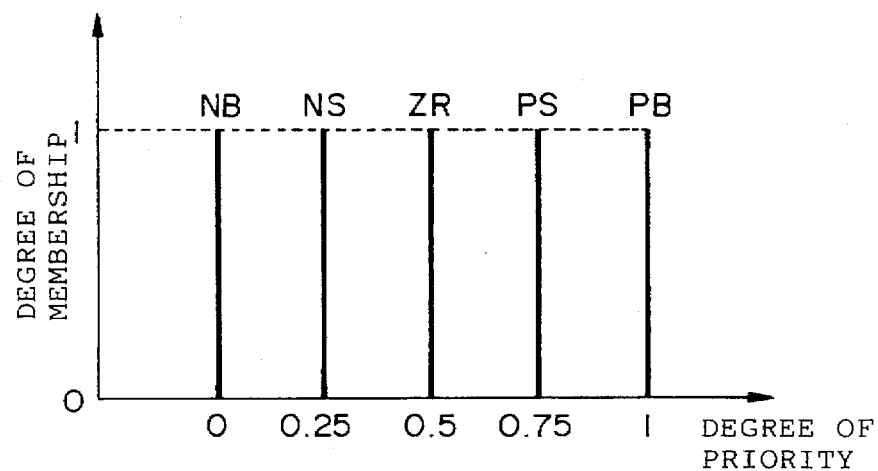

|  | CONTACT WHICH IS CANDIDATE FOR CAUSE OF FAILURE | | | | |
|---|---|---|---|---|---|
|  | 04 | 05 | 06 | 08 | 09 |
| FEATURE 1 | INTERNAL | INTERNAL | INTERNAL | SPECIAL | INTERNAL |
| FEARURE 2 | 4 | 5 | 1 | 3 | 1 |
| FEATURE 3 | SERIAL | SERIAL | SERIAL | SERIAL | SERIAL |
| FEATURE 4 | a | a | a | a | a |
| FEATURE 5 | 2 | 4 | 2 | 3 | 1 |
| FEATURE 6 | 2 | 2 | 2 | 2 | 1 |

| RULE | DEGREE OF MEMBERSHIP OF ANTECEDENT | DEGREE OF MEMBERSHIP OF CONSEQUENT | OVERALL DEGREE OF MEMBERSHIP |
|---|---|---|---|
| RULE 1 | 1 | 1 (PB) | 1 (PB) |
| RULE 2 | 0 | 0 (PB) | |
| RULE 3 | 1 | 1 (PB) | |
| RULE 4 | 0 | 0 (NB) | 0 (NB) |
| RULE 6 | 0 | 0 (NB) | |
| RULE 5 | 0 | 0 (NS) | 0 (NS) |
| RULE 7 | 0 | 0 (NS) | |
| RULE 8 | 1 | 1 (PS) | 1 (PS) |

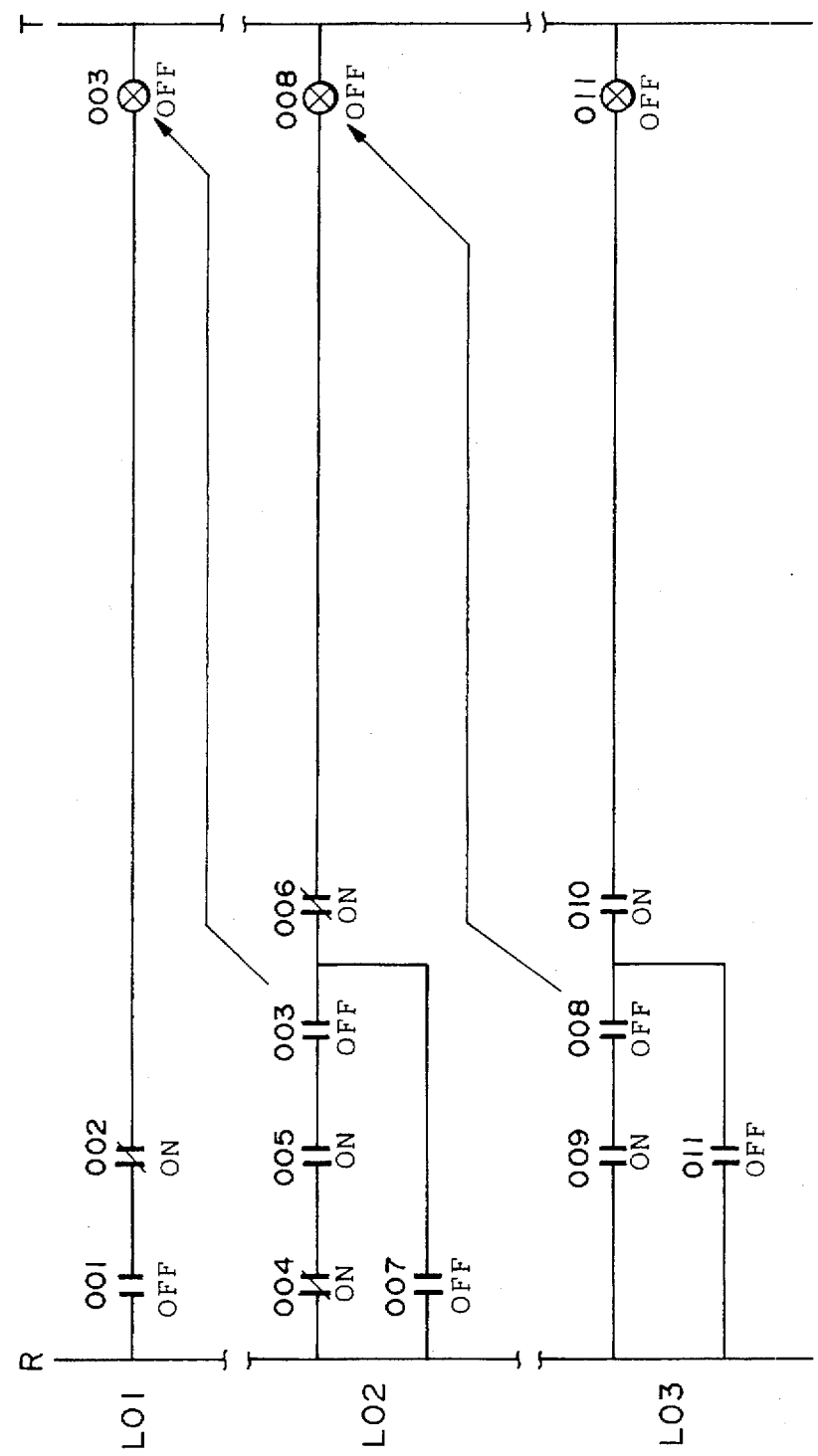

5,742,624

FAULT DETECTING APPARATUS AND METHOD

TECHNICAL FIELD

This invention relates to a fault detecting apparatus and method. More particularly, the invention relates to an apparatus and method for detecting a location at which a failure is possible in one or both of a detector and actuator in a controlled system by investigating the internal states of a programmable logic controller (hereinafter referred to simply as a "PLC").

BACKGROUND ART

PLCs are used widely in the sequence control of a large variety of controlled systems.

The controlled system is provided with many detectors (sensors and switches such as proximity switches, limit switches and photoelectric detectors) for extracting the operating state of the system, as well as a plurality of actuators (air cylinders, hydraulic cylinders, motors, etc.) for driving each component of the controlled system.

The signals from the detectors are applied to a PLC as input signals. The PLC, in which a user program for controlling the controlled system has been installed in advance, generates outputs signals (relay signals) for controlling the actuators in accordance with the user program in response to the input signals.

In general, the function of the PLC, namely the user program that has been installed in the PLC, is expressed by a ladder circuit (diagram). A ladder circuit comprises a plurality of individual ladder circuits.

FIG. 27 shows an example of a ladder circuit represented by a ladder diagram. This ladder circuit has individual ladder circuits L01, L02 and L03.

The individual ladder circuit L01 is composed of contacts (actual input contacts) 001 and 002 representing the status of input signals provided by the detectors of a controlled system, and an output relay 003. The individual ladder circuit L02 is composed of actual input contacts 004, 005, 006 and 007, a contact (internal auxiliary contact) 003 controlled by the output relay 003, and an output relay 008. The individual ladder circuit L03 is composed of actual input contacts 009, 010, an internal auxiliary contact 008 controlled by the output relay 008, a self-holding contact 011 of an output relay 011, and the output relay 011.

The contacts 001, 003, 005, etc., are a contacts (make contacts), and the contacts 002, 004 and 006, etc., are b contacts (break contacts).

If all of the serially connected contacts are ON (closed), then the output relay connected to these contacts also is ON (closed). The relay outputs are sent to actuators to actuate them. For example, if the contacts 001 and 002 in the individual ladder circuit L01 are ON, then the output relay 003 also is ON. Further, if the contacts 004, 005, 003 and 006 are ON or the contacts 007 and 006 are ON in the individual ladder circuit L02, then the output relay 008 also is ON.

In a case where a prescribed operation is not performed in the PLC constituted by such a ladder circuit owing to a failure in the controlled system or a defect in a contact, the operator ascertains the abnormal location by referring to the states of the input/output signals and the ladder diagram of the PLC or the program list of the ladder program.

More specifically, the operator specifies the actuator that is not operating normally and specifies the output relay that is applying the output signal to the specified actuator. Then, while referring to the ladder diagram or program list, the operator scans and checks, one by one, the plurality of contacts connected to the specified output relay.

For example, consider a case in which the specified output relay is the output relay 011, which is in the OFF state regardless of the fact that it should be ON.

First, the contacts 010, 008, 009 and 011 connected to the output relay 011 are investigated to see if they are ON. If the contact 008 is OFF, then the output relay 008 controlling the contact 008 and the contacts 006, 003, 005, 004 and 007 connected to the output relay 008 are investigated to see if they are ON. If, by way of example, the contact 003 is OFF, then the output relay 003 and the contacts 001 and 002 connected to the output relay 003 are investigated. If the contact 001 is OFF, then this contact and the detector that applies the input signal to the contact are taken as candidates for cause of the failure. Alternatively, in a case where the contact 007 is an actual input contact and is in the OFF state, the contact 007 and the detector that applies a signal to this contact also are taken as candidates for cause of the failure.

Thus, the operator specifies the output relay that is not in the normal state, investigates the contacts, which are connected to this output relay, while tracing them in successive fashion, extracts a contact and the detector that applies the signal to this contact as candidates for cause of the failure and eventually specifies the faulty location.

In such detection of a faulty location by the operator, however, a problem which arises is that the operator cannot specify an actuator as well as the output relay of the ladder circuit that applies the signal to this actuator unless the operator has an understanding of the overall operation of the entire controlled system.

Further, even if the operator does understand the overall operation of the controlled system, it is not easy to specify an abnormally operating actuator and the output relay applying the signal to this actuator if the controlled system is large in scale and complex.

Furthermore, even if the output relay of a ladder circuit can be specified, it is necessary for the operator to ascertain the abnormal location while referring successively to the states of the input/output signals and the ladder diagram or program list of the PLC. For this reason, the detection of a faulty location is a troublesome task and a time-consuming one as well. Accordingly, repairing the failure and restarting the controlled system requires a long period of time. In particular, the larger the scale of the ladder circuit and the more complicated it becomes, the greater the time needed to detect the location of the failure.

DISCLOSURE OF THE INVENTION

An object of the present invention is to provide a fault detecting apparatus and method in which a candidate for a detector that has possibly failed can be detected easily and in a short period of time.

Another object of the present invention is to provide a fault detecting apparatus and method in which an actuator that has possibly failed can be detected easily and in a short period of time.

Still another object of the present invention is to provide a fault detecting apparatus and method in which an actuator that does not operate normally can be detected with ease and in a short period of time, and in which a candidate for a detector that is the cause of the abnormal operation can be detected with ease and in a short period of time.

A further object of the present invention is to provide a fault detecting apparatus and method in which a candidate for a contact due to an error in a user program or erroneous designation of an output relay can be detected with ease and in a short period of time.

An apparatus for detecting a fault in a detector according to a first aspect of the present invention detects the fault through a control apparatus, which controls a controlled system including one or two or more detectors and one or two or more actuators, having input-signal memory means for storing the state of an input signal from the detector, auxiliary input-signal memory means for storing the state of an input signal provided by auxiliary-signal generating means, arithmetic-logic means for generating an output signal to be applied to the actuator in accordance with predetermined logic in conformity with the states of the input signals stored in the input-signal memory means and auxiliary input-signal memory means, and output-signal memory means for storing the state of the output signal generated by the arithmetic-logic means, wherein when there is an actuator not operating normally in the controlled system, a detector that is possibly faulty in the controlled system is detected through the control apparatus, the apparatus for detecting the fault comprising a designation input unit for designating an identification code of an abnormal output signal corresponding to the actuator not operating normally, input-signal extracting means for extracting an input signal that has influenced a logical operation, performed by the arithmetic-logic means, which gave rise to the abnormal output signal designated by the designation input unit, determining means for determining whether the input signal extracted by the input-signal extracting means is the signal that has been stored in the input-signal memory means, and a storage device which, if result of the determination by the determining means is that the extracted input signal is the signal that has been stored in the input-signal memory means, stores the identification code of this input signal.

A method of detecting a fault in a detector according to the first aspect of the present invention detects the fault through a control apparatus, which controls a controlled system including one or two or more detectors and one or two or more actuators, having input-signal memory means for storing the state of an input signal from the detector, auxiliary input-signal memory means for storing the state of an input signal provided by auxiliary-signal generating means, arithmetic-logic means for generating an output signal to be applied to the actuator in accordance with predetermined logic in conformity with the states of the input signals stored in the input-signal memory means and auxiliary input-signal memory means, and output-signal memory means for storing the state of the output signal generated by the arithmetic-logic means, wherein when there is an actuator not operating normally in the controlled system, a detector that is possibly faulty in the controlled system is detected through the control apparatus, the method of detecting the fault comprising designating an identification code of an abnormal output signal corresponding to the actuator not operating normally, extracting an input signal that has influenced a logical operation, performed by the arithmetic-logic means, which gave rise to the designated abnormal output signal, determining whether the extracted input signal is the signal that has been stored in the input-signal memory means, and, if result of the determination is that the extracted input signal is the signal that has been stored in the input-signal memory means, storing the identification code of this input signal in a storage device.

In accordance with the first aspect of the present invention, operation is such that when the identification code of an abnormal output signal corresponding to an actuator that does not operate normally is designated/the input signal that has influenced the logical operation which produces the designated abnormal output signal is extracted. The identification code of an input signal that has been stored in the input-signal memory means is stored in the storage device.

The input signal that has been stored in the storage device is a signal from a detector in the controlled system. Therefore, in a case where the actuator does not operate normally, a candidate for a detector causing the abnormality can be detected and specified easily and in a short period of time.

Preferably, the identification code of the input signal stored in the storage device is displayed on a display unit. As a result, the user or operator can visually confirm which input signal has been extracted.

In a preferred embodiment of the first aspect of the present invention, operation is such that in a case where the result of determination is that the extracted input signal is the signal that has been stored in the auxiliary input-signal memory means and that it is controlled by the state of the output signal of the control apparatus, processing for extracting the input signal that has influenced the logical operation, performed by the arithmetic-logic means, which gave rise to the abnormal output signal that controls the state of the extracted input signal is repeated.

As a result, in a case where the extracted input signal is one controlled by the state of the output signal of the control apparatus, an input signal that has influenced the logical operation giving rise to the output signal can also be investigated, and it is also possible to detect a failure in the detector corresponding to the input signal.

Further, in another embodiment of the first aspect of the present invention, operation is such that in a case where a plurality of input signals have been extracted, degree of priority is calculated with regard to each input signal. The extraction of the input signals ends when the number of input signals stored in the storage device becomes larger than a predetermined prescribed number or when there are no longer any input signals to be extracted. In a case where the extraction has not ended, the above-mentioned determination is performed in regular order starting from the input signal for which the calculated degree of priority is high when a plurality of input signals have been extracted, and is performed with regard to one input signal when one input signal has been extracted.

As a result, if a plurality of candidates for cause of a failure have been extracted, candidates can be limited to that having a high degree of priority and a faulty detector can be discovered in a shorter period of time.

In this embodiment, it is preferred that the degree of priority be calculated by performing fuzzy reasoning based upon features obtained with regard to each extracted input signal. Accurate inferential processing can be carried out by performing fuzzy reasoning based upon the features of the input signal, and it is possible to select only a candidate having a high possibility of being the cause of a failure from among the extracted plurality of candidates.

In yet another embodiment of the first aspect of the present invention, the control apparatus is constituted by a programmable logic controller, the state of the input signal corresponds to the state of a contact of the programmable logic controller, and the state of the output signal corresponds to the state of a relay of the programmable logic controller.

An apparatus for detecting a fault in an actuator according to a second aspect of the present invention detects the fault through a control apparatus, which controls a controlled system including one or two or more detectors and one or two or more actuators, having input-signal memory means for storing the state of an input signal from the detector, auxiliary input-signal memory means for storing the state of an input signal provided by auxiliary-signal generating means, arithmetic-logic means for generating an output signal to be applied to the actuator in accordance with predetermined logic in conformity with the states of the input signals stored in the input-signal memory means and auxiliary input-signal memory means, and output-signal memory means for storing the state of the output signal generated by the arithmetic-logic means, wherein when there is an actuator not operating normally in the controlled system, the actuator is detected through the control apparatus, the apparatus for detecting the fault comprising first determining means for determining whether a prescribed condition for generation of an output signal to be applied to the actuator has been established, second determining means for determining whether the state of the output signal is normal, and third determining means which, in a case where it has been determined by the first determining means and second determining means that the state of the output signal has not become normal even upon elapse of a prescribed time from establishment of the prescribed condition, determines that the actuator to which this output signal is to be applied is faulty.

A method of detecting a fault in an actuator according to the second aspect of the present invention detects the fault through a control apparatus, which controls a controlled system including one or two or more detectors and one or two or more actuators, having input-signal memory means for storing the state of an input signal from the detector, auxiliary input-signal memory means for storing the state of an input signal provided by auxiliary-signal generating means, arithmetic-logic means for generating an output signal to be applied to the actuator in accordance with predetermined logic in conformity with the states of the input signals stored in the input-signal memory means and auxiliary input-signal memory means, and output-signal memory means for storing the state of the output signal generated by the arithmetic-logic means, wherein when there is an actuator not operating normally in the controlled system, the actuator is detected through the control apparatus, the method of detecting the fault comprising determining whether a prescribed condition for generation of an output signal to be applied to the actuator has been established, determining whether the state of the output signal is normal, and, in a case where it has been determined that the state of the output signal has not become normal even upon elapse of a prescribed time from establishment of the prescribed condition, determining that the actuator to which this output signal is to be applied is faulty.

In accordance with the second aspect of the present invention, monitoring is performed to determine whether a condition for generation of the output signal to be applied to the actuator has been established or not. In a case where the state of the output signal is not normal regardless of the fact that the condition has been established, it is judged that the actuator to which the output signal is applied is faulty. Accordingly, when there is an actuator not operating normally, this can be detected and specified easily and rapidly.

In an embodiment of the second aspect of the present invention, the control apparatus is constituted by a programmable logic controller, the state of the input signal corresponds to the state of a contact of the programmable logic controller, and the state of the output signal corresponds to the state of a relay of the programmable logic controller.

In this embodiment, it is preferred that all of the determinations be made by the programmable logic controller. As a result, the actuator fault detecting function can be installed in the programmable logic controller, which is the control apparatus, thereby making integration possible.

An apparatus for detecting a fault in an actuator and a detector according to a third aspect of the present invention detects the fault through a control apparatus, which controls a controlled system including one or two or more detectors and one or two or more actuators, having input-signal memory means for storing the state of an input signal from the detector, auxiliary input-signal memory means for storing the state of an input signal provided by auxiliary-signal generating means, arithmetic-logic means for generating an output signal to be applied to the actuator in accordance with predetermined logic in conformity with the states of the input signals stored in the input-signal memory means and auxiliary input-signal memory means, and output-signal memory means for storing the state of the output signal generated by the arithmetic-logic means, wherein when there is an actuator not operating normally in the controlled system, the actuator is detected through the control apparatus and a detector that is possibly faulty in the controlled system and a cause of failure of the actuator is detected through the control apparatus, the apparatus for detecting the fault comprising first determining means for determining whether a prescribed condition for generation of an output signal to be applied to the actuator has been established, second determining means for determining whether the state of the output signal is normal, third determining means which, in a case where it has been determined by the first determining means and second determining means that the state of the output signal has not become normal even upon elapse of a prescribed time from establishment of the prescribed condition, determines that the actuator to which this output signal is to be applied is faulty, input-signal extracting means for extracting an input signal that has influenced a logical operation, performed by the arithmetic-logic means, which gave rise to the abnormal output signal determined by the third determining means, fourth determining means for determining whether the input signal extracted by the input-signal extracting means is the signal that has been stored in the input-signal memory means, and a storage device which, if result of the determination by the fourth determining means is that the extracted input signal is the signal that has been stored in the input-signal memory means, stores the identification code of this input signal.

A method of detecting a fault in an actuator and a detector according to the third aspect of the present invention detects the fault through a control apparatus, which controls a controlled system including one or two or more detectors and one or two or more actuators, having input-signal memory means for storing the state of an input signal from the detector, auxiliary input-signal memory means for storing the state of an input signal provided by auxiliary-signal generating means, arithmetic-logic means for generating an output signal to be applied to the actuator in accordance with predetermined logic in conformity with the states of the input signals stored in the input-signal memory means and auxiliary input-signal memory means, and output-signal memory means for storing the state of the output signal generated by the arithmetic-logic means, wherein when there is an actuator not operating normally in the controlled system, the actuator is detected through the control apparatus and a detector that is possibly faulty in the controlled system and a cause of failure of the actuator is detected through the control apparatus, the method of detecting the fault comprising determining whether a prescribed condition for generation of an output signal to be applied to the actuator has been established, determining whether the state of the output signal is normal, determining, in a case where it has been determined that the state of the output signal has not become normal even upon elapse of a prescribed time from establishment of the prescribed condition, that the actuator to which this output signal is to be applied is faulty, extracting an input signal that has influenced a logical operation, performed by the arithmetic-logic means, which gave rise to the abnormal output signal for which the fault has been determined, determining whether the extracted input signal is the signal that has been stored in the input-signal memory means, and, if result of the determination is that the extracted input signal is the signal that has been stored in the input-signal memory means, storing the identification code of this input signal.

In accordance with the third aspect of the present invention, detection of a fault in an actuator is performed in the same manner as in the second aspect of the present invention. When it is judged that an actuator is faulty, a candidate for a detector causing the failure of the actuator is detected as in the manner of the first aspect of the invention automatically. As a result, actuator fault detection and extraction of a candidate for a detector that has possibly failed and caused the fault can be performed in operative association. Actuator fault detection can be performed easily and rapidly, and extraction of a candidate for failure of the detector causing the fault also can be carried out easily and rapidly.

Preferably, the identification code of the input signal stored in the storage device is displayed on a display unit. As a result, the user or operator can visually confirm which input signal has been extracted.

In a preferred embodiment of the third aspect of the present invention, operation is such that in a case where the result of determination is that the extracted input signal is the signal that has been stored in the auxiliary input-signal memory means and that it is controlled by the state of the output signal of the control apparatus, processing for extracting the input signal that has influenced the logical operation, performed by the arithmetic-logic means, which gave rise to the abnormal output signal that controls the state of the extracted input signal is repeated.

As a result, in a case where the extracted input signal is one controlled by the state of the output signal of the control apparatus, an input signal that has influenced the logical operation giving rise to the output signal can also be investigated, and it is also possible to detect a failure in the detector corresponding to the input signal.

Further, in another embodiment of the third aspect of the present invention, operation is such that in a case where a plurality of input signals have been extracted, degree of priority is calculated with regard to each input signal. The detection of the input signals ends when the number of input signals stored in the storage device becomes larger than a predetermined prescribed number or when there are no longer any input signals to be extracted. In a case where the extraction has not ended, the above-mentioned determination is performed in regular order starting from the input signal for which the calculated degree of priority is high when a plurality of input signals have been extracted, and is performed with regard to one input signal when one input signal has been extracted.

As a result, if a plurality of candidates for cause of a failure have been extracted, candidates can be limited to that having a high degree of priority and a faulty detector can be discovered in a shorter period of time.

In this embodiment, it is preferred that the degree of priority be calculated by performing fuzzy reasoning based upon features obtained with regard to each extracted input signal. Accurate inferential processing can be carried out by performing fuzzy reasoning based upon the features of the input signal, and it is possible to select only a candidate having a high possibility of being the cause of a failure from among the extracted plurality of candidates.

In yet another embodiment of the third aspect of the present invention, the control apparatus is constituted by a programmable logic controller, the state of the input signal corresponds to the state of a contact of the programmable logic controller, and the state of the output signal corresponds to the state of a relay of the programmable logic controller.

In this embodiment, it is preferred that the determination as to whether the prescribed condition for generation of an output signal to be applied to the actuator has been established, the determination as to whether the state of the output signal is normal and the determination that the actuator to which the output signal is to be applied is faulty in a case where the state of the output signal has not become normal even upon elapse of a prescribed time from establishment of the prescribed condition, are made by the programmable logic controller.

As a result, the actuator fault detecting function can be installed in the programmable logic controller, which is the control apparatus, thereby making integration possible.

An apparatus for detecting a fault in an input signal according to a fourth aspect of the present invention, wherein a control apparatus, which controls a controlled system including one or two or more detectors and one or two or more actuators, has input-signal memory means for storing the state of an input signal from the detector, auxiliary input-signal memory means for storing the state of an input signal provided by auxiliary-signal generating means, arithmetic-logic means for generating an output signal to be applied to the actuator in accordance with predetermined logic in conformity with the states of the input signals stored in the input-signal memory means and auxiliary input-signal memory means, and output-signal memory means for storing the state of an output signal generated by the arithmetic-logic means, wherein when there is an actuator not operating normally in the controlled system, an input signal that is possibly abnormal is detected, the apparatus for detecting the fault comprising a designation input unit for designating an identification code of an abnormal output signal corresponding to the actuator not operating normally, input-signal extracting means for extracting an input signal that has influenced a logical operation, performed by the arithmetic-logic means, which gave rise to the abnormal output signal designated by the designation input unit, and a storage device for storing the identification code of the input signal extracted by the input-signal extracting means.

A method of detecting a fault in an input signal according to a fourth aspect of the present invention, wherein a control apparatus, which controls a controlled system including one or two or more detectors and one or two or more actuators, has input-signal memory means for storing the state of an input signal from the detector, auxiliary input-signal memory means for storing the state of an input signal provided by auxiliary-signal generating means, arithmetic-logic means for generating an output signal to be applied to the actuator in accordance with predetermined logic in conformity with the states of the input signals stored in the input-signal memory means and auxiliary input-signal memory means, and output-signal memory means for storing the state of an output signal generated by the arithmetic-logic means, wherein when there is an actuator not operating normally in the controlled system, an input signal that is possibly abnormal is detected, the method of detecting the fault comprising designating an identification code of an abnormal output signal corresponding to the actuator not operating normally, extracting an input signal that has influenced a logical operation, performed by the arithmetic-logic means, which gave rise to the designated abnormal output signal, and storing the identification code of the extracted input signal in a storage device.

In accordance with the fourth aspect of the present invention, operation is such that when the identification code of an abnormal output signal corresponding to an actuator that does not operate normally is designated, the input signal that has influenced the logical operation which produces the designated abnormal output signal is extracted. The extracted input signal is stored in the storage device.

Accordingly, in a case where the actuator does not operate normally, all candidates for an abnormal input signal that is the cause can be detected and specified easily and in a short period of time.

Preferably, the identification code of the input signal stored in the storage device is displayed on a display unit. As a result, the user or operator can visually confirm which input signal has been extracted.

BRIEF DESCRIPTION OF THE DRAWINGS

FIG. 16a shows fuzzy reasoning rules for obtaining degree of priority of a contact, and FIG. 16b shows a membership function of the consequents of the rules shown in FIG. 16a;

FIG. 17a is a ladder diagram showing an example of a ladder program, and FIG. 17b shows the values of contact features 1 through 6 in FIG. 17a;

FIG. 27 is a ladder diagram showing an example of a ladder program.

BEST MODE FOR CARRYING OUT THE INVENTION

I. Fault detecting apparatus and control system

Figure 1:
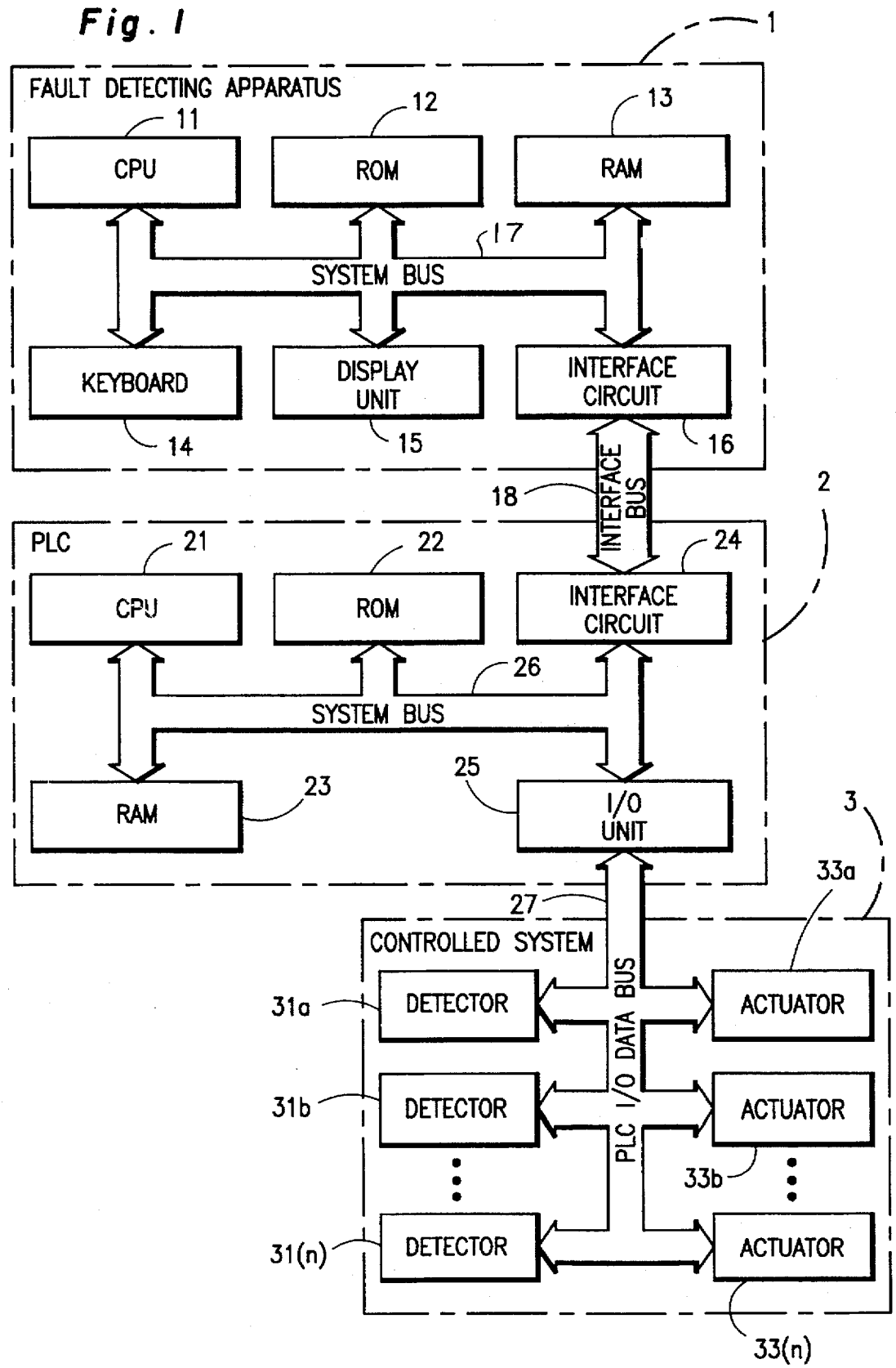
FIG. 1 is a block diagram illustrating the constructions of a fault detecting apparatus, a PLC and a controlled system.

FIG. 1 is a block diagram illustrating the construction of a fault detecting apparatus 1 and of a control system comprising a PLC 2 and a controlled system 3 controlled by the PLC 2.

The fault detecting apparatus 1 detects failure of detectors 31a ... 31n (sensors and switches such as proximity switches, limit switches and photoelectric detectors) and actuators 33a ... 33n (air cylinders, hydraulic cylinders, motors, etc.) of the controlled system 3, and detects abnormality in the contacts of the PLC 2. The fault detecting apparatus 1 is constructed as a unit separate from the PLC proper. Of course, all of the functions of the fault detecting apparatus 1 can be incorporated in the PLC proper so that the fault detecting apparatus 1 and PLC 2 may be constructed as a single body.

The fault detecting apparatus 1 is constituted by a CPU 11, a ROM 12, a RAM 13, a keyboard 14, a display unit 15 and an interface circuit 16. These devices are interconnected by a system bus 17.

The ROM 12 stores a program for detecting faulty locations and a program for controlling devices (the keyboard 14, display unit 15, etc.) constructing the fault detecting apparatus 1.

In accordance with the programs that have been stored in the ROM 12, the CPU 11 executes fault detecting processing and controls each of the devices constructing the fault detecting apparatus 1.

The RAM 13 temporarily stores data resulting from the processing executed by the CPU 11, data entered by the user or operator (user) via the keyboard 14, and data that is input/output between the fault detecting apparatus and the PLC 2 via the interface circuit 16.

The keyboard 14 is for allowing the user to enter data. The entered data is the number of an output relay or the number of a contact, etc., of a ladder circuit, as will be set forth later.

The display unit 15, which is for displaying the results of fault detection processing, is constituted by a CRT or the like. For example, the number of a contact extracted as the cause of a failure is displayed as the result of fault detection processing.

The interface circuit 16 carries out data communication between the fault detecting apparatus 1 and the PLC 2 via an interface bus 18, and performs control for data communication.

The PLC 2 is constituted by a CPU 21, a ROM 22, a RAM 23, an interface circuit 24 and an I/O unit 25. These devices are interconnected by a system bus 26.

A ladder-control system program is stored in the ROM 22.

A user program (ladder program) created by the user in order to control the controlled system is stored in part of the area of the RAM 23, and an I/O table holding the ON, OFF states of actual input/output signals of the PLC is stored in the other part.

The CPU 21 controls the controlled system 3 in accordance with the ladder-control system program stored in the ROM 22 and the user program stored in the RAM 23.

The interface circuit 24 is connected to the interface circuit 16 of the fault detecting apparatus 1 by the interface bus 18 and, as set forth above, performs data communication between the fault detecting apparatus 1 and PLC 2 and carries out control for data communication.

The I/O unit 25 sends and receives input/output signals to and from the detectors and actuators of the controlled system 3 via a PLC I/O data bus 27.

Though the details will be described later, the controlled system 3 is equipped with a plurality of detectors for detecting workpieces or burrs on the workpieces, and a plurality of actuators for controlling pneumatic cylinders, which remove defective workpieces, or drilling motors. These detectors and actuators send and receive input/output signals to and from the I/O unit 25 of the PLC 2 via the PLC I/O data bus 27.

II. Construction of controlled system and example of control thereof

Figure 2:
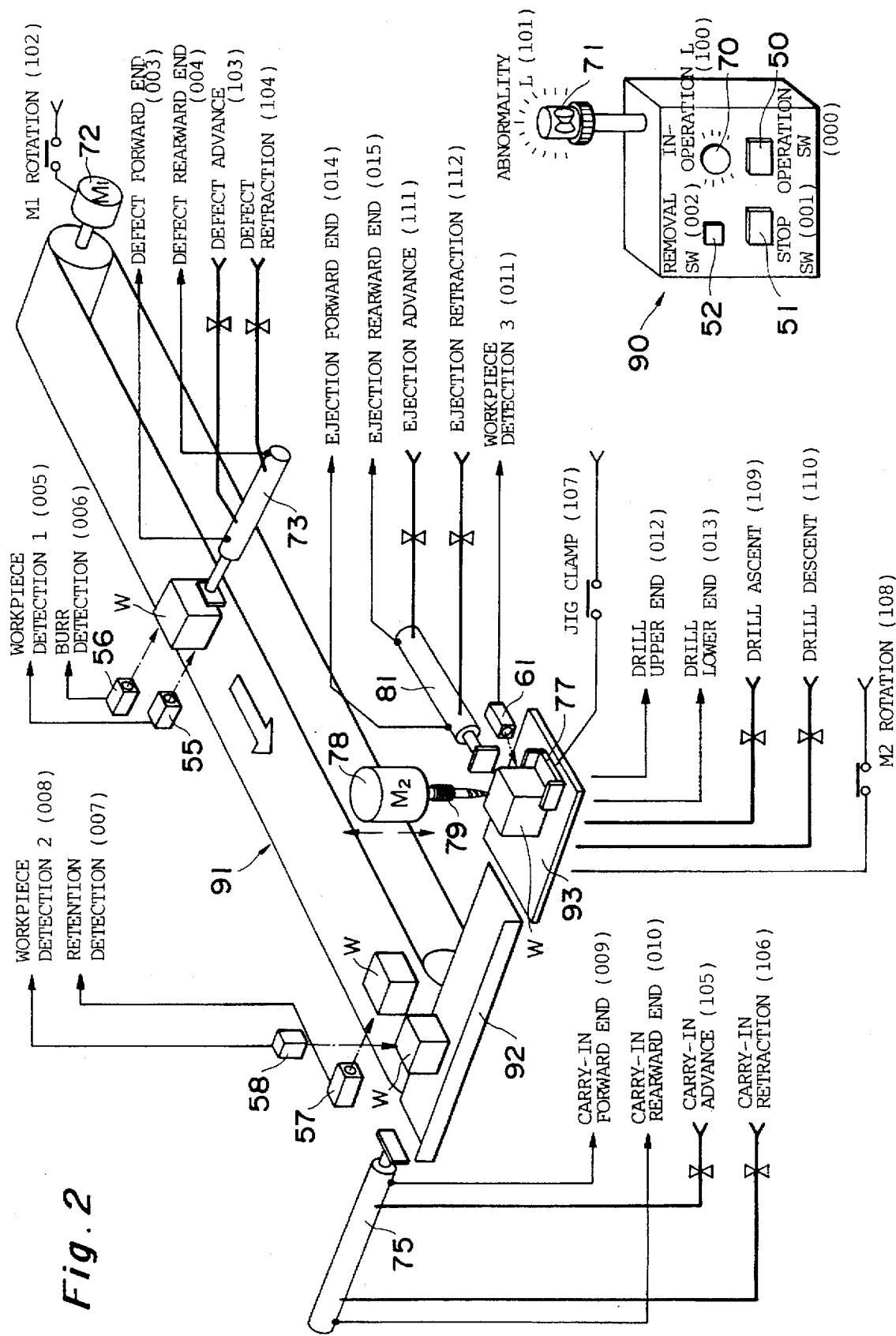
FIG. 2 is a structural view showing an example of the controlled system.

FIG. 2 shows an example of the controlled system 3.

Workpieces W are conveyed by a conveyor 91, which is driven by a first motor (M1) 72. Detection of the presence of workpieces W and detection of burrs on the workpieces W is performed automatically at points along the conveyor 91. A first workpiece detector 55 and a burr detector 56 are provided for these purposes. If it is detected that a workpiece W has a burr or that a burr is larger than a prescribed quantity, this workpiece is removed from the conveyor 91 by a defect-rejecting pneumatic cylinder 73. Rotation of the motor 72 is halted during operation of the cylinder 73, thereby stopping the conveyor 91.

A workpiece W conveyed to the end of the conveyor 91 by the conveyor is shifted onto a conveyance base 92. A retention detector 57 is provided for detecting the workpiece W that has been conveyed to the proximity of the end of the conveyor 91. If detection of the workpiece W by the retention detector 57 continues for more than a fixed period of time, an abnormality lamp 71 lights on a control panel 90.

A second workpiece detector 58 is provided in order to detect the workpiece W that has been shifted onto the conveyance base 92. When the workpiece W is detected by the workpiece detector 58, a carry-in pneumatic cylinder 75 is driven so that the workpiece W is pushed along the conveyance base 92 toward a machining table 93 by a rod provided in the carry-in pneumatic cylinder 75. The workpiece W transferred to the machining table 93 is detected by a third workpiece detector 61.

When the workpiece W is transferred to the machining table 93, a jig 77 that secures the workpiece W is driven in a direction in which it will clamp the workpiece. Further, a second motor (72) 78 is driven into rotation so that a drill 79 secured to the rotary shaft of the motor 78 will descend along with the motor 78 and drill a hole in the workpiece W. After the drilling operation, the drill 79 is raised along with the motor 78 and rotation of the motor 78 is halted. The drilled workpiece is ejected from the machining table 93 by an ejecting pneumatic cylinder 81.

The control panel 90 is provided with an operation switch 50, a stop switch 51, a removal switch 52, an in-operation lamp 70 and an abnormality lamp 71. By turning on the operation switch 50, the above-described series of steps that commences with start-up of the motor 72 begins and the in-operation lamp 70 lights. When the stop switch 51 is turned on, the operations performed in the above-mentioned steps halt and the in-operation lamp 70 is extinguished. When the detection signal from the detector 57 continues in excess of the fixed period of time, as set forth above, the abnormality lamp 71 lights and the in-operation lamp 70 is extinguished. If the removal switch 52 is turned on in this state, the abnormality lamp 71 is extinguished.

The defect-rejecting pneumatic cylinder 73 is provided with a defect forward-end detector for detecting that the cylinder rod has been advanced (forwarded) to a forward end, and with a defect rearward-end detector for detecting that the cylinder rod has been retracted to a rearward end. (Neither of the detectors is shown.) Similarly, the carry-in cylinder 75 is provided with a carry-in forward-end detector and a carry-in rearward-end detector, and the ejecting pneumatic cylinder 81 is provided with an ejection forward-end detector and an ejection rearward-end detector (none of these detectors being shown). Furthermore, there are provided a drill upper-end detector for detecting that the drill 79 (as well as the motor 78 in which the drill is mounted) has ascended to its raised end, and a drill lower-end detector for detecting that the drill 79 (as well as the motor) has descended to its lowered end. (Neither of the detectors is shown.)

The signals which enter the PLC 2 from the controlled system 3 are as follows, where (000) to (015) at the head are the numbers of the input signals and the wording within the parentheses at the tail is an abbreviated expression:

(000) ON/OFF signal of operation switch 50 (operation SW)

(001) ON/OFF signal of stop switch 51 (stop SW)

(002) ON/OFF signal of removal switch 52 (removal SW)

(003) detection signal from defect forward-end detector (defect forward end)

(004) detection signal from defect rearward-end detector (defect rearward end)

(005) workpiece detection signal from first workpiece detector 55 (detection 1)

(006) burr detection signal from burr detector 56 (burr detection)

(007) detection signal from retention detector 57 (retention detection)

(008) workpiece detection signal from second workpiece detector 58 (detection 2)

(009) detection signal from carry-in forward-end detector (carry-in forward end)

(010) detection signal from carry-in rearward-end detector (carry-in rearward end)

(011) workpiece detection signal from third workpiece detector 61 (detection 3)

(012) detection signal from drill upper-end detector (drill upper end)

(013) detection signal from drill lower-end detector (drill lower end)

(014) detection signal from ejection forward-end detector (ejection forward end)

(015) detection signal from ejection rearward-end detector (ejection rearward end)

The signals output from the PLC 2 to the controlled system 3 are as follows, where (100) to (012) at the head are the numbers of the output signals and the wording within the parentheses at the tail is an abbreviated expression:

(100) ON/OFF control signal of in-operation lamp 70 (in-operation L)

(101) ON/OFF control signal of abnormality lamp 71 (abnormality L)

(102) rotating-drive control signal of first motor 72 (M1 rotation)

(103) advance-drive control signal of defect-rejecting cylinder 73 (defect advance)

(104) retraction-drive control signal of defect-rejecting cylinder 73 (defect retraction)

(105) advance-drive control signal of carry-in cylinder 75 (carry-in advance)

(106) retraction-drive control signal of carry-in cylinder 75 (carry-in retraction)

(107) clamping-drive control signal of fixing jig 77 (jig clamp)

(108) rotating-drive control signal of second motor 78 (M2 rotation)

(109) raising-drive control signal of drill 79 (drill ascent)

(110) lowering-drive control signal of drill 79 (drill descent)

(111) advance-drive control signal of ejecting cylinder 81 (ejection advance)

(112) retraction-drive control signal of ejecting cylinder 81 (ejection retraction)

Figure 3:
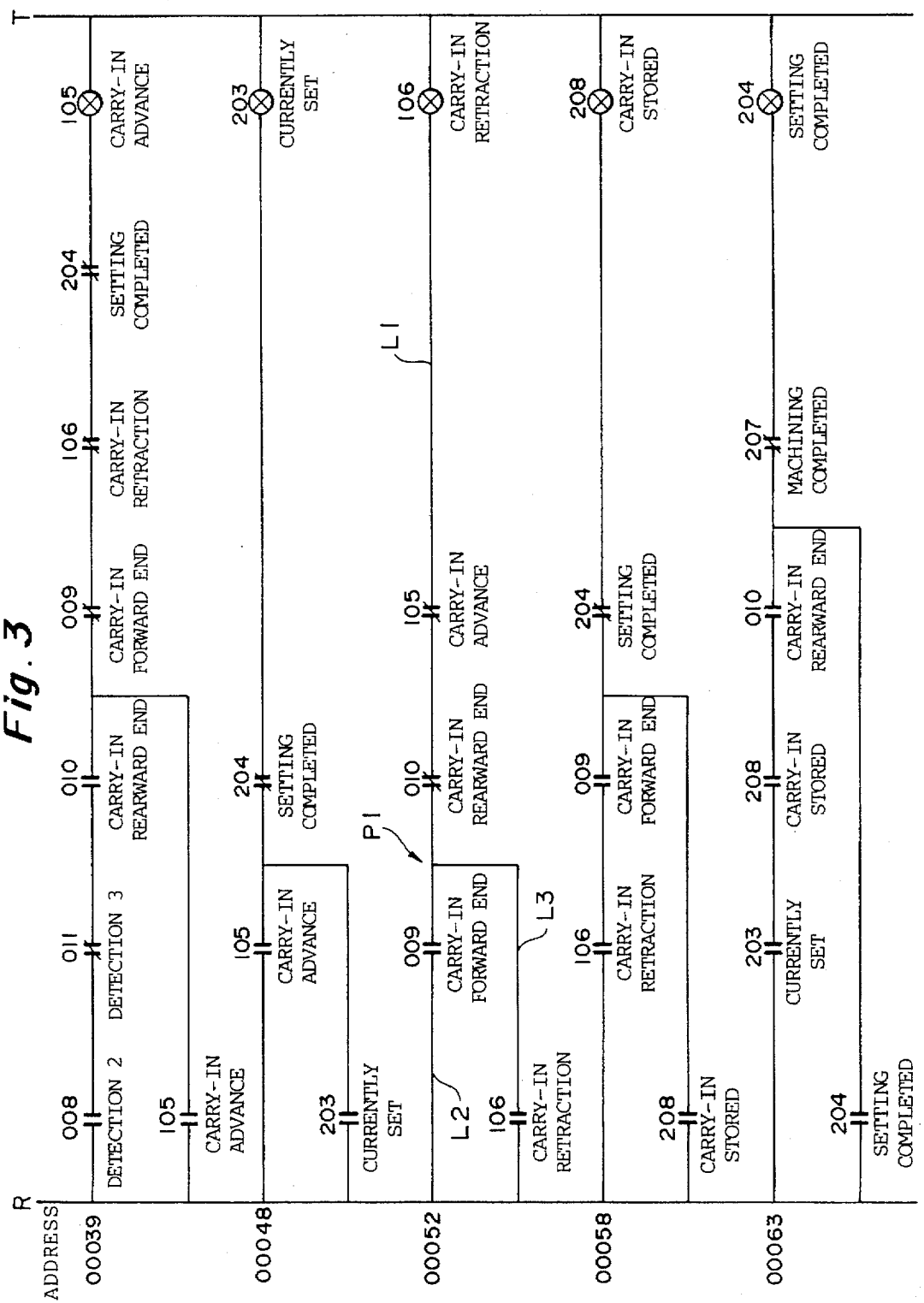
FIG. 3 is a ladder diagram showing an example of a user program.
Figure 4:
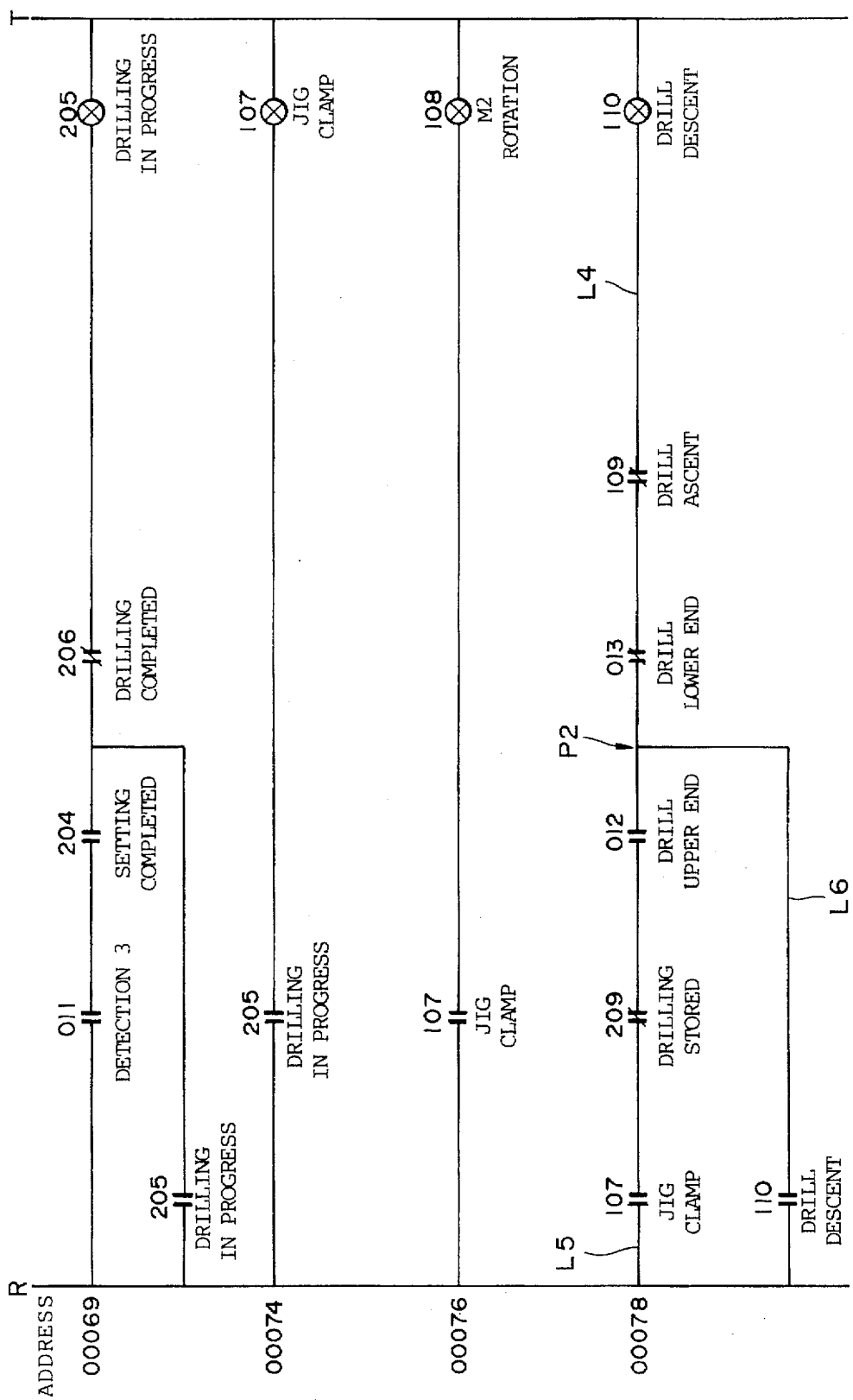
FIG. 4 is a ladder diagram showing an example of a user program.

FIGS. 3 and 4 illustrate part of a program (user program) stored in the RAM 23 of PLC 2. The program is represented using contacts turned ON and OFF by input signals, output relays for generating output signals, contacts turned ON and OFF by the output relays, internal auxiliary relays and their contacts.

The meaning of the internal auxiliary relays and their contacts illustrated in FIGS. 3 and 4 is as follows: "CURRENTLY SET" represents the start of overall drilling machining; the relay or contact is ON until completion of drilling and ejection of the workpiece. "SETTING COMPLETED" represents that setting of the workpiece on the machining table has been completed. "MACHINING COMPLETED" represents that ejection of the workpiece from the machining table has been completed. "CARRY-IN STORED" represents that the workpiece has been carried in to the machining table; the relay and contact are ON until machining and ejection of the workpiece have been completed. "DRILLING IN PROGRESS" represents that the workpiece has been set on the machining table; the relay and contact are ON until drilling is completed. "DRILLING COMPLETED" represents that drilling of the workpiece has been completed. "DRILLING STORED" represents that the drill has drilled the workpiece; the contact is ON until the completion of drilling.

Figure 5:
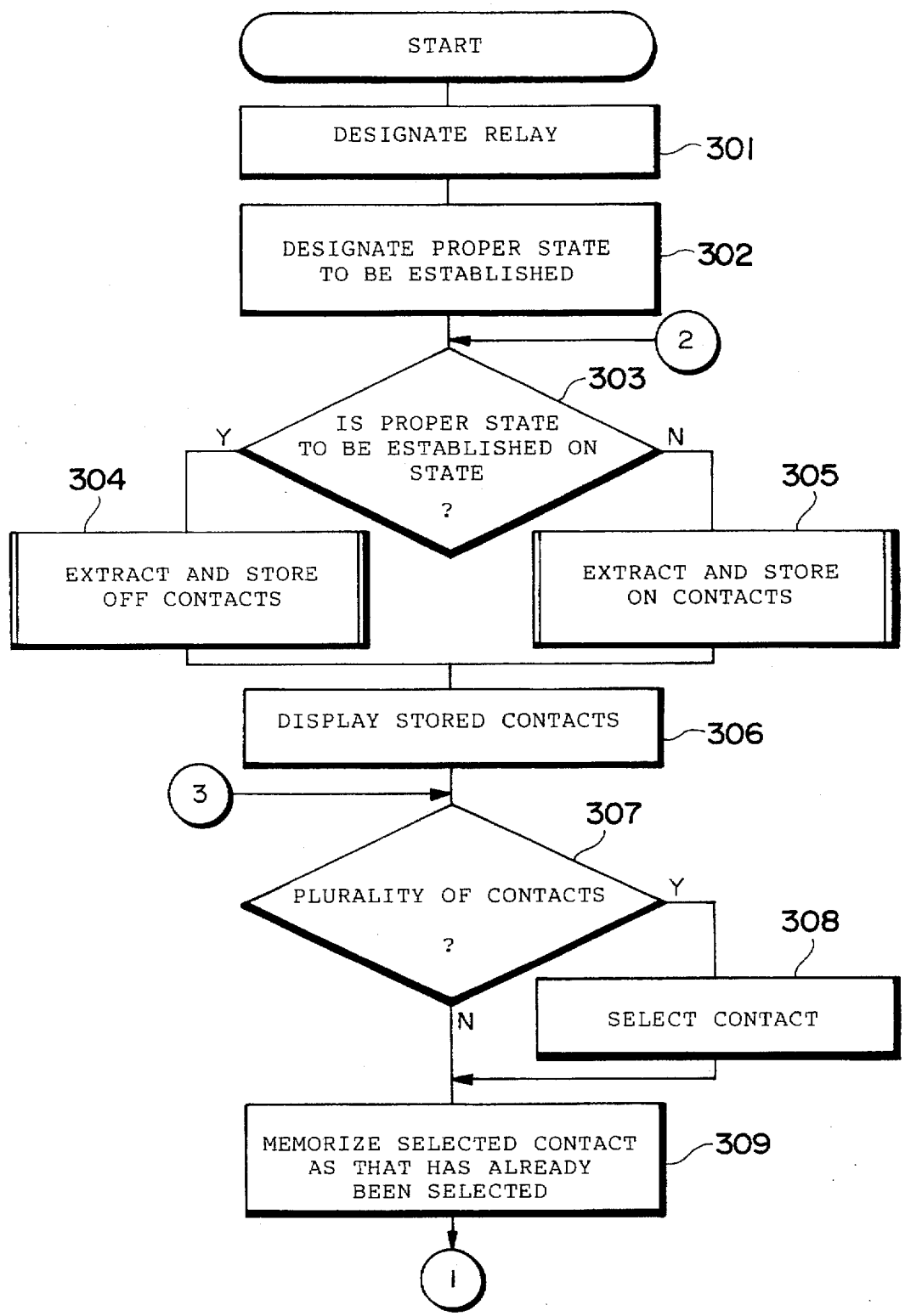
FIGS. 5 and 6 are flowcharts illustrating the flow of processing for detecting failure of a detector.
Figure 6:
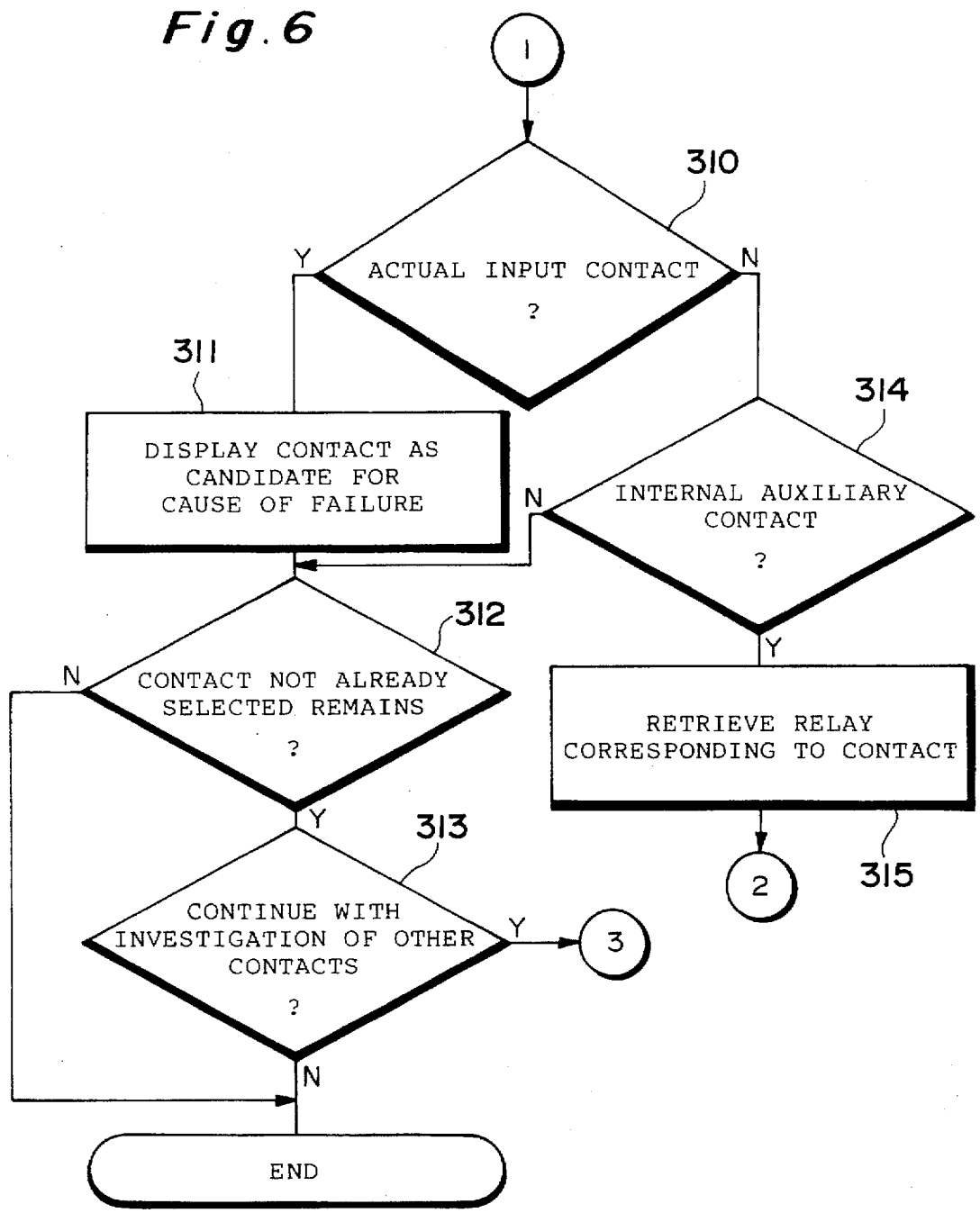
Figure 7:
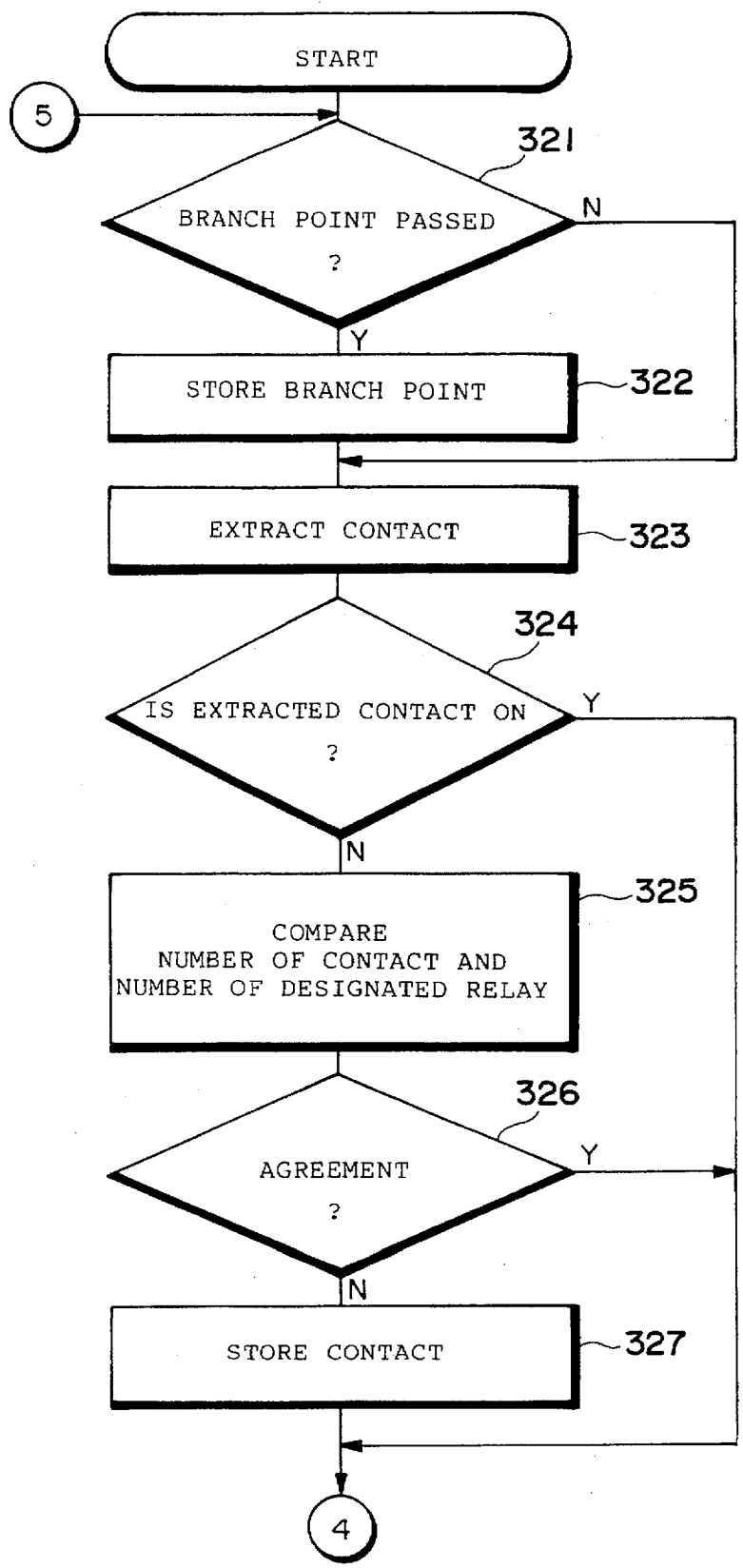
FIGS. 7 and 8 are flowcharts illustrating the flow of processing for extracting and storing contacts in an OFF state.
Figure 8:
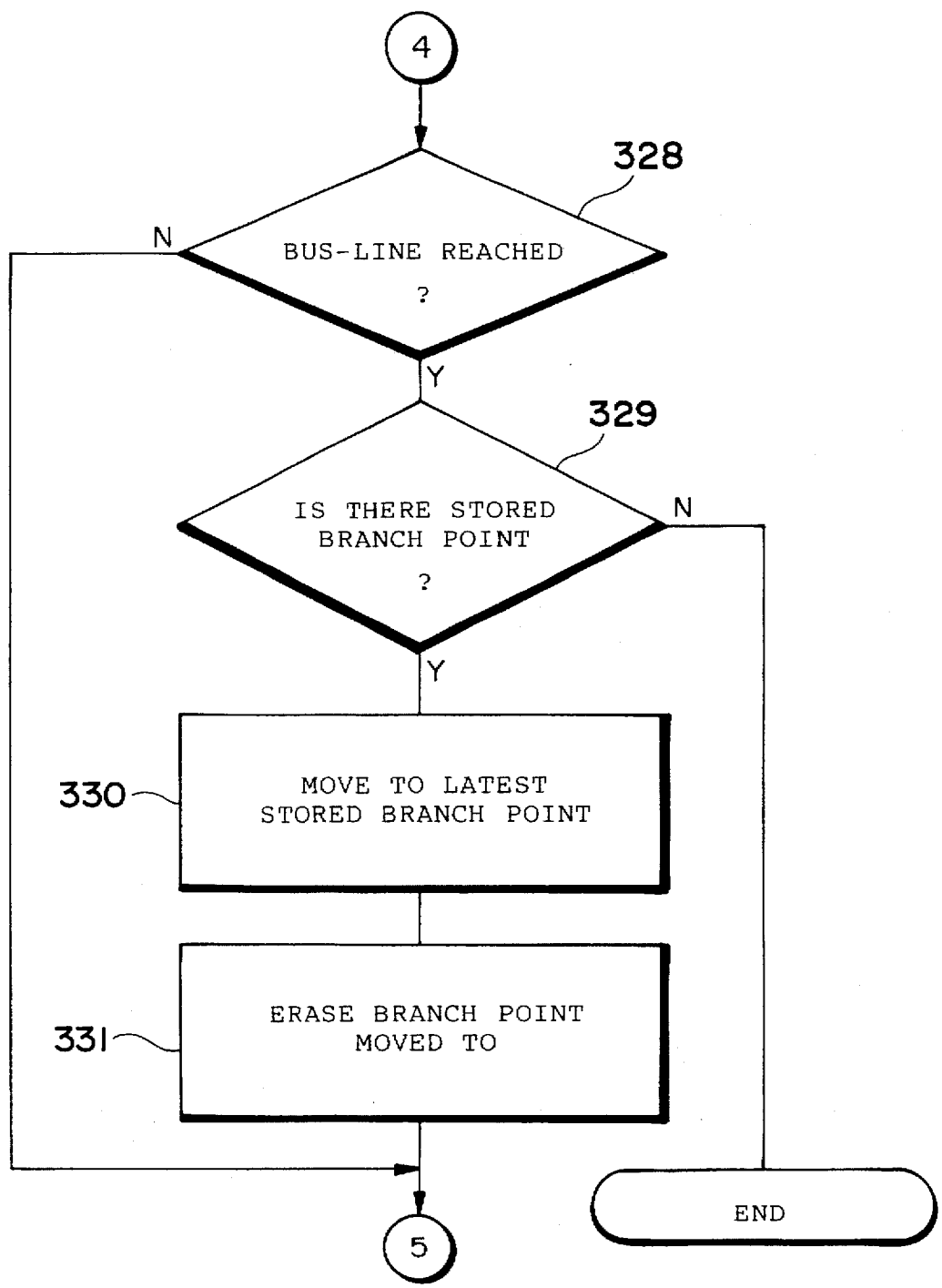
Figure 9:
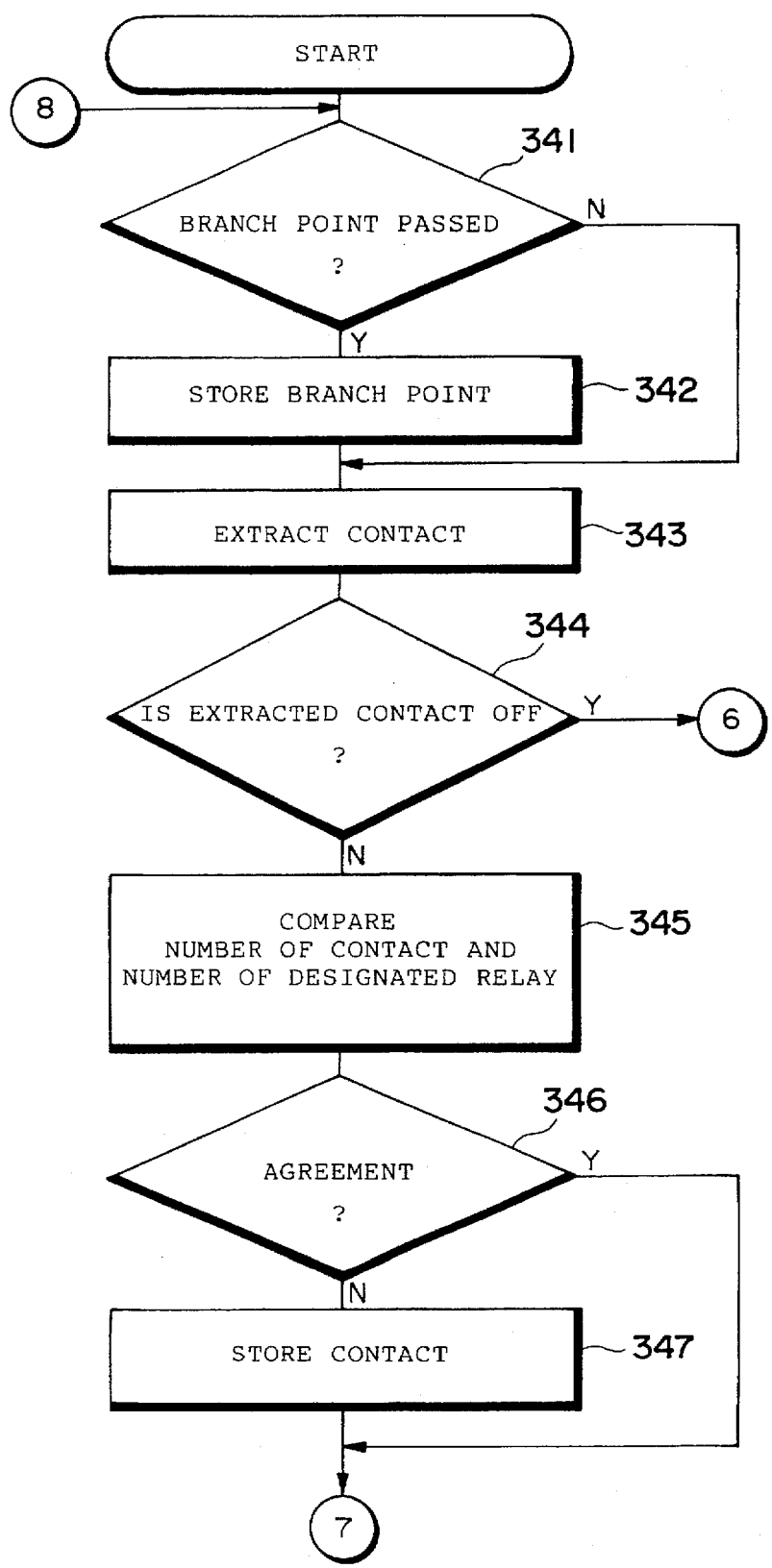
FIGS. 9 and 10 are flowcharts illustrating the flow of processing for extracting and storing contacts in an ON state.
Figure 10:
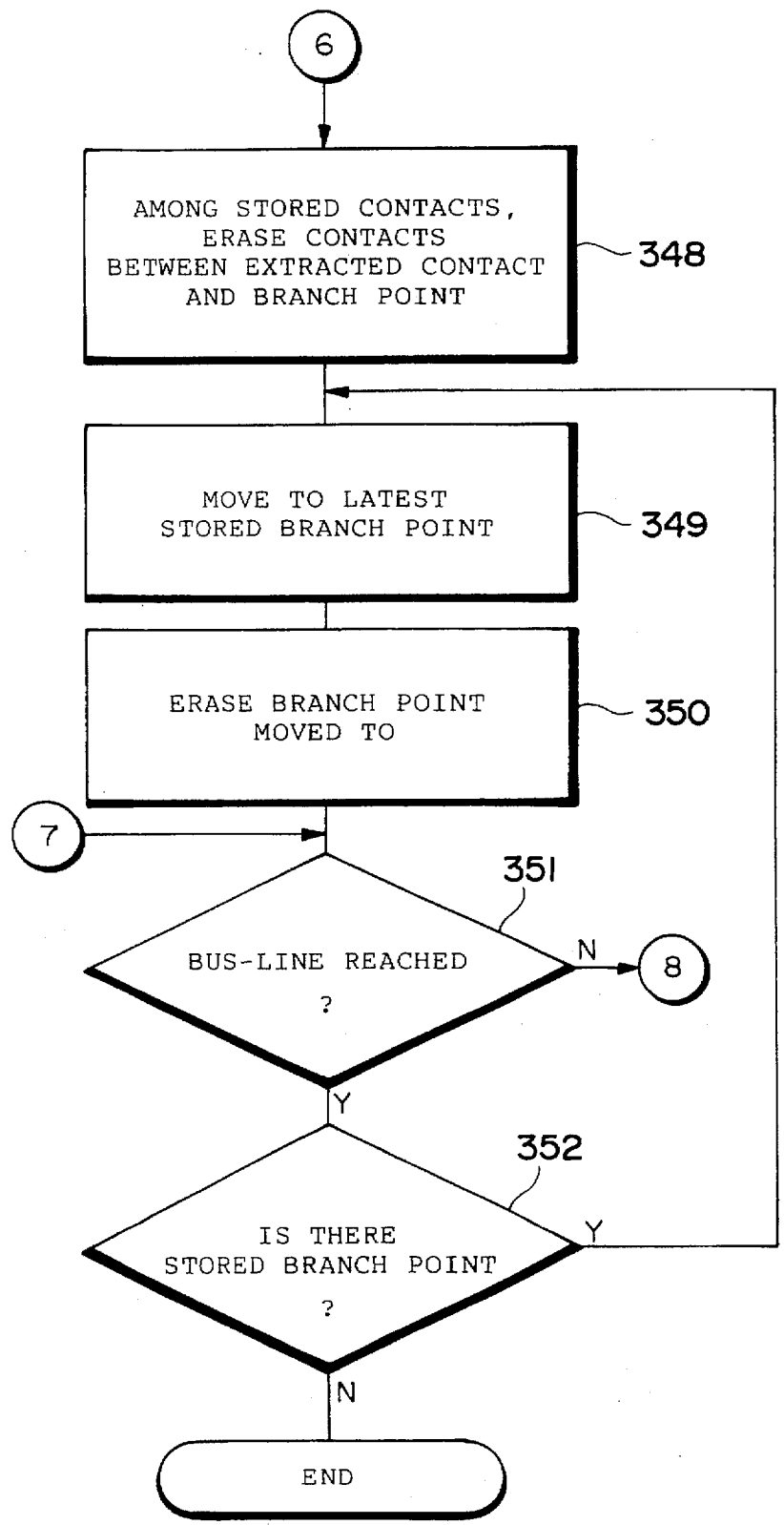

III. Fault detection processing by fault detecting apparatus (1) Processing for detecting faulty detectors FIGS. 5 and 6 are flowcharts illustrating the flow of processing through which the fault detecting apparatus 1 detects a candidate for a detector that is possibly faulty in a case where a failure has developed in a detector of the controlled system 3. FIGS. 7 and 8 are flowcharts illustrating the detailed flow of processing of a step 304 in FIG. 5. FIGS. 9 and 10 are flowcharts illustrating the detailed flow of processing of a step 305 in FIG. 5.

A user specifies an actuator that does not perform a prescribed operation in the controlled system 3. The user specifies the relay (output relay) applying the signal to this actuator and enters the information (e.g., the relay number) specifying this output relay into the fault detecting apparatus 1 using the keyboard 14 (step 301). The CPU 11 stores the entered relay number in the RAM 13.

Next, using the keyboard 14, the user enters into the fault detecting apparatus 1 whether the proper state that is to be established at the designated relay is the ON (closed) or OFF (open) state (step 302). This state also is stored in the RAM 13 by the CPU 11.

If the designated relay is in the OFF state regardless of the fact that it is originally intended to be in the ON state (YES at step 303), then an OFF contact that is the cause of this condition should be among the contacts that have been connected to the designated relay. Therefore, OFF contacts are extracted and stored in the RAM 13 (step 304). If the designated relay is in the ON state regardless of the fact that it is originally intended to be in the OFF state (NO at step 303), then an ON contact that is the cause of this condition should be among the contacts that have been connected to the designated relay. Therefore, ON contacts are extracted and stored in the RAM 13 (step 305).

Extraction of the contacts is carried out by the CPU 11, which accesses the PLC 2 using the interface circuit 16 and interface bus 18 and searches the ladder program that has been stored in the RAM 23 of the PLC 2. Verification of the ON or OFF state of an extracted contact is carried out by searching the I/O table holding the ON, OFF states of each of the contacts in the ladder program. The details of the processing executed at steps 304, 305 will be described later.

All contacts extracted and stored in the RAM 13 are displayed on the display unit 15 to inform the user (step 306).

In a case where a plurality of contacts are displayed on the display unit 15 (YES at step 307), the user selects one contact from among the displayed contacts, and information (e.g., the contact number) which designates this contact is entered into the fault detecting apparatus 1 using the keyboard 14 (step 308). If one contact is displayed (NO at step 307), then this contact is selected automatically by the CPU 11.

The fact that the contact has been selected is written in the RAM 13 by the CPU 11 with regard to the selected contact (e.g., a flag indicating that the contact has been selected is set) so that selection of the same contact will not occur in subsequent processing (step 309).

Next, it is determined whether the selected contact is an actual input contact (step 310). The term "actual input contact" refers to a contact which represents the state of the input signal applied to it from the detector of the controlled system 3.

The determination as to whether the contact is an actual input contact or not can be performed by storing a table, in which the numbers of the actual input contacts have been registered, in the RAM 13 or RAM 23 in advance, and checked to see whether the number of the selected contact resides in this table. If the number of the selected contact resides in the table, then this contact is an actual input contact. Alternatively, the foregoing can be performed by searching the ladder program to determine whether there is a relay whose number is the same as that of the contact. If there is a relay whose number is identical with that of the selected contact, then this contact is not an actual input contact. In FIG. 3, the contact 105 at address 00048 in the ladder circuit is not an actual input contact because there is relay 105 having the same number located at address 00039.

In a case where the selected contact is an actual input contact (YES at step 310), the fact that this contact is a candidate for cause of failure is displayed on the display unit 15 to so inform the user (step 311).

Next, whether the contacts stored in the RAM 13 include a contact that has not been selected is determined by the CPU 11 (step 312). If an unselected contact does reside in the RAM 13 (YES at step 312), the user makes an entry as to whether or not investigation of other contacts as cause of failure is to continue. In a case where investigation of other candidates is to continue (YES at step 313), then processing from step 307 is repeated in order perform the processing for other contacts.

Processing is terminated in a case where unselected contacts do not remain in the RAM 13 (NO at step 312) or in a case where investigation of other candidates is not to continue (NO at step 313).

In a case where the selected contact is not an actual input contact at step 310, it is determined whether this contact is an internal auxiliary contact (step 314).

The term "internal auxiliary contact" refers to a contact which is not an actual input contact (a contact representing the state of the input signal from the detector in the controlled system 3) but a contact controlled by an output relay or internal auxiliary relay. Whether or not a contact is an internal auxiliary contact can be determined by checking to see whether a relay having the same number as that of this contact is present in the ladder program. If there is a contact having a number the same as that of this contact, then this contact is an internal auxiliary contact.

In a case where the selected contact is an internal auxiliary contact (YES at step 314), a relay (an output relay or internal auxiliary relay) having the same number as that of this contact is retrieved (step 315). This is because the fact that the internal auxiliary contact is the cause of a failure is considered to mean that the contact connected to the relay that controls the state of this internal auxiliary contact is the cause of the failure. The processing from step 303 onward is repeated in order to extract a contact that is a candidate for the cause of the failure from among the contacts that have been connected to the retrieved relay and to store this contact in the RAM 13.

In a case where the selected contact is not an actual input contact and is not an internal auxiliary contact (NO at step 314), processing regarding this contact is not executed and processing from step 312 onward is executed in order to execute processing with regard to the other contacts that have been stored in the RAM 13.

An example of a component which is not an actual input contact and not an internal auxiliary contact is a special auxiliary contact or link relay, etc.

A special auxiliary contact is a contact whose ON or OFF state is controlled by the ladder-control system program or the like. For example, such contacts include a contact whose state is controlled by a clock signal or whose state is decided by an operational instruction or a flag. A link relay is a contact the state of which is controlled by a PLC other than the PLC 2 via communication means.

These contacts are not subjected to processing because they do not take part in fault detection of the detectors in the controlled system 3.

The details of the processing of step 304 will now be described on the basis of FIGS. 7 and 8. In a case where a relay is in the OFF state regardless of the fact that it should be in the ON state, the processing of step 304 extracts a contact in the OFF state as the cause.

As one example a case will be considered in which the carry-in cylinder 75 in FIG. 2 remains in an advanced state and will not retract.

In response to the fact that the carry-in cylinder 75 will not retract, the user ascertains that the carry-in retraction signal 106, namely the output relay 106 (carry-in retraction) in FIG. 3, is abnormal (OFF) and uses the keyboard 14 to enter the number of the output relay 106 into the fault detecting apparatus 1.

As set forth above, first a contact is extracted by searching the user program (ladder program) that has been stored in the RAM 23. Next, the ON or OFF state of the contact is checked by searching the I/O table that has been stored in the RAM 23. If the state of the contact is OFF, this contact is stored in the RAM 13.

Processing for extracting a contact will now be described in accordance with the ladder diagram of FIG. 3.

An OFF contact, which is a candidate for cause of a failure, is extracted by searching the ladder circuit (ladder program) from the output relay 106 to a bus-line R (FIG. 3).

First, the search point is advanced along line L1 (FIG. 3) from the relay 106 toward the bus-line R and a determination is made as to whether a branch point (branch point P1 in FIG. 3) at which contacts have been connected in parallel has been passed (step 321). In a case where the ladder program is expressed in the form of mnemonic symbols, the search in the program describing an individual ladder diagram is carried out from an OUT instruction to an LD instruction (load instruction). If an OR instruction or OR LD instruction (OR load instruction) is contained in the program, it is understood that a branch point has been reached.

Since the contacts 105 and 010 are located ahead of the branch point P1, the search point does not pass the branch point (NO at step 321) and the contact 105 is extracted (step 323).

Next, it is determined whether the extracted contact 105 is in the ON state or not (step 324). Assume that the contact 105 is in the OFF state. In this case (NO at step 324), the number 105 of the contact and the number 106 of the designated relay are compared (step 325). Since the two numbers do not agree in this case (NO at step 326), the contact 105 is stored in the RAM 13 as a candidate for cause of failure (step 327).

The reason for comparing the number of the extracted contact and the number of the designated relay is to exclude self-holding contacts from being the object of extraction. For example, the contact 106 is a self-holding contact of relay 106, and the contact 106 also is turned ON and OFF by the turning ON and OFF of the relay 106. Accordingly, it is unnecessary for the self-holding contact to be adopted as an object of extraction.

Next, it is determined whether the search point has reached the bus-line R of the ladder circuit (step 328). In mnemonic representation, it is understood that the bus-line has been reached if there is an LD instruction (load instruction).

Since the search point has not reached the bus-line R (NO at step 328), processing is repeated from step 321. The contact 010 is extracted and it is determined whether the contact 010 is in the ON state (steps 321 to 324) in the same manner as in the case of the contact 105. Assume that the contact 010 is in the ON state. In this case (YES at step 324), the contact 010 is not deemed to be a contact causing failure and the contact is not stored in the RAM 13.

When the search point advances further toward the bus-line R from the contact 010, it passes the branch point P1 (YES at step 321) and, hence, the branch point P1 is stored in the RAM 13 (step 322). One line L2 branching from the branch point P1 is selected and the contact 009 is extracted (step 323). Assume that the contact 009 is in the OFF state. The branch point 009 is stored in the RAM 13 as a candidate for cause of failure (steps 324 to 327).

When the search point advances along the line L2, it reaches the bus-line R (YES at step 328) and therefore it is determined whether there is a branch point that has been stored (step 329). Since branch point P1 has been stored (YES at step 329), the search point is moved to the branch point P1 stored most recently (stored last) (step 330). (In this embodiment, branch point P1 is the sole branch point and therefore is the branch point stored most recently.) The branch point P1 is then erased from the RAM 13 (step 331).

The search point is moved from the branch point P1 along one other line L3 and extraction of the contact is performed (steps 321 to 323). Contact 106 is extracted on line L3. However, since this contact constructs a self-holding circuit together with the relay 106, as mentioned above, the contact is not stored in the RAM 13 even if the contact is OFF (YES at step 326).

The search point reaches the bus-line R on line L3 (YES at step 328) and, since there are no stored branch points (NO at step 329), processing for extracting contacts that are the cause of failure ends.

The contacts extracted and stored in the RAM 13 are contacts 105 and 009. The processing from step 306 onward in FIG. 5 is applied to these contacts as set forth above. In a case where the contact 105 has been selected at step 308, the relay 105 is retrieved at step 315 because the contact 105 is an internal auxiliary contact. The ON, OFF states of the contacts 204, 106 and so on connected to the relay 105 also are investigated and, if a contact is in the OFF state, it is stored in the RAM 13.

Next, the details of the processing of step 305 will be described on the basis of FIGS. 9 and 10. In a case where a relay is in the ON state regardless of the fact that it should be OFF, the processing of step 305 extracts an ON contact as the cause.

As one example a case will be considered in which the drill 79 in FIG. 2 remains in a lowered state and will not ascend.

In response to the fact that the drill 79 will not ascend, the user ascertains that the drill descent signal 110, namely the output relay 110 (drill descent) in FIG. 4, is abnormal (ON state) and uses the keyboard 14 to designate the relay 110.

An ON contact that is a candidate for cause of failure is extracted by searching the ladder circuit from the designated relay 110 to a bus-line R.

First, the search point is advanced along line L4 (FIG. 4) from the relay 110 toward the bus-line R and a determination is made as to whether a branch point (branch point P2 in FIG. 4) at which contacts have been connected in parallel has been passed (step 341). Since the contacts 109 and 013 are located ahead of the branch point P2, the search point does not pass the branch point (NO at step 341) and the contact 109 is extracted (step 343).

Next, it is determined whether the extracted contact 109 is in the OFF state or not (step 344). Assume that the contact 109 is in the ON state. In this case (NO at step 344), the number 109 of the contact and the number 110 of the designated relay are compared (step 345). Since the two numbers do not agree in this case (NO at step 346), the contact 109 is stored in the RAM 13 as a candidate for cause of failure (step 347). This is to exclude self-holding contacts from being the object of extraction, mentioned earlier.

Next, it is determined whether the search point has reached the bus-line R of the ladder circuit (step 351). Since the search point has not reached the bus R (NO at step 351), processing is repeated from step 341. The contact 013 is extracted in the same manner as in the case of the contact 109. If it is assumed that the contact 013 is in the ON state, then the contact 013 is stored in the RAM 13 (steps 314 to 347).

When the search point advances further toward the bus-line R from the contact 013, it passes the branch point P2 (YES at step 341) and, hence, the branch point P2 is stored in the RAM 13 (step 342). The search point advances on one line L5 from the branch point P2 and the contact 012 is extracted (step 343). Assume that the contact 012 is in the ON state. The branch point 012 is stored in the RAM 13 as a candidate for cause of failure (steps 344 to 347).

Next, the contact 209 is extracted and, if it is assumed that the contact 209 is in the ON state, the contact 209 also is stored in the RAM 13.

Next, the contact 107 is extracted (step 343). Assume that this contact is in the OFF state. In this case (YES at step 344), among the contacts that have been stored in the RAM 13, the contacts 209 and 012, which are between the extracted contact 107 and the branch point P2, are erased from the RAM 13 (step 348). The reason for this is as follows: If any contact on the line L5 between the branch point P2 and the bus-line R is in the OFF state, the overall state of the line L5 is OFF even if the other contacts on this line are ON. Since this acts to place the relay 110 in the OFF state, the contacts on line L5 are not considered to be the cause of failure. In this case, the contact that is the cause of failure is present on line L4 or line L6.

Next, the search point moves to the branch point P2 stored most recently (last) (step 349). The branch point P2 is erased from the RAM 13 (step 350).

Next, contact 110 is extracted on line L6 (step 343). However, since this contact is a self-holding circuit (YES at step 346), as mentioned above, the contact is not stored in the RAM 13.

The search point reaches the bus-line R (YES at step 351) and, since there are no stored branch points (NO at step 352), processing for extracting contacts that are the cause of failure ends.

The contacts extracted and stored in the RAM 13 are contacts 109 and 013. The processing from step 306 onward in FIG. 5 is applied to these contacts as set forth above.

Thus, regardless of whether a designated relay is ON or OFF, a contact that is a candidate for cause of failure can be extracted automatically from among the contacts connected to this relay. In a case where an extracted contact is an actual input contact, the user is so informed. As a result, a detector corresponding to this actual input contact, and which is possibly causing a failure, can be specified easily and rapidly.

(2) Automatic selection of contacts

If a plurality of contacts are extracted as candidates for cause of failure in the above-described processing for extracting contacts as such candidates, this result is presented to the user, who then selects one contact from these contacts (step 308 in FIG. 5).

Selection of this contact can also be carried out automatically.

(2-1) Overview of processing

Figure 11:
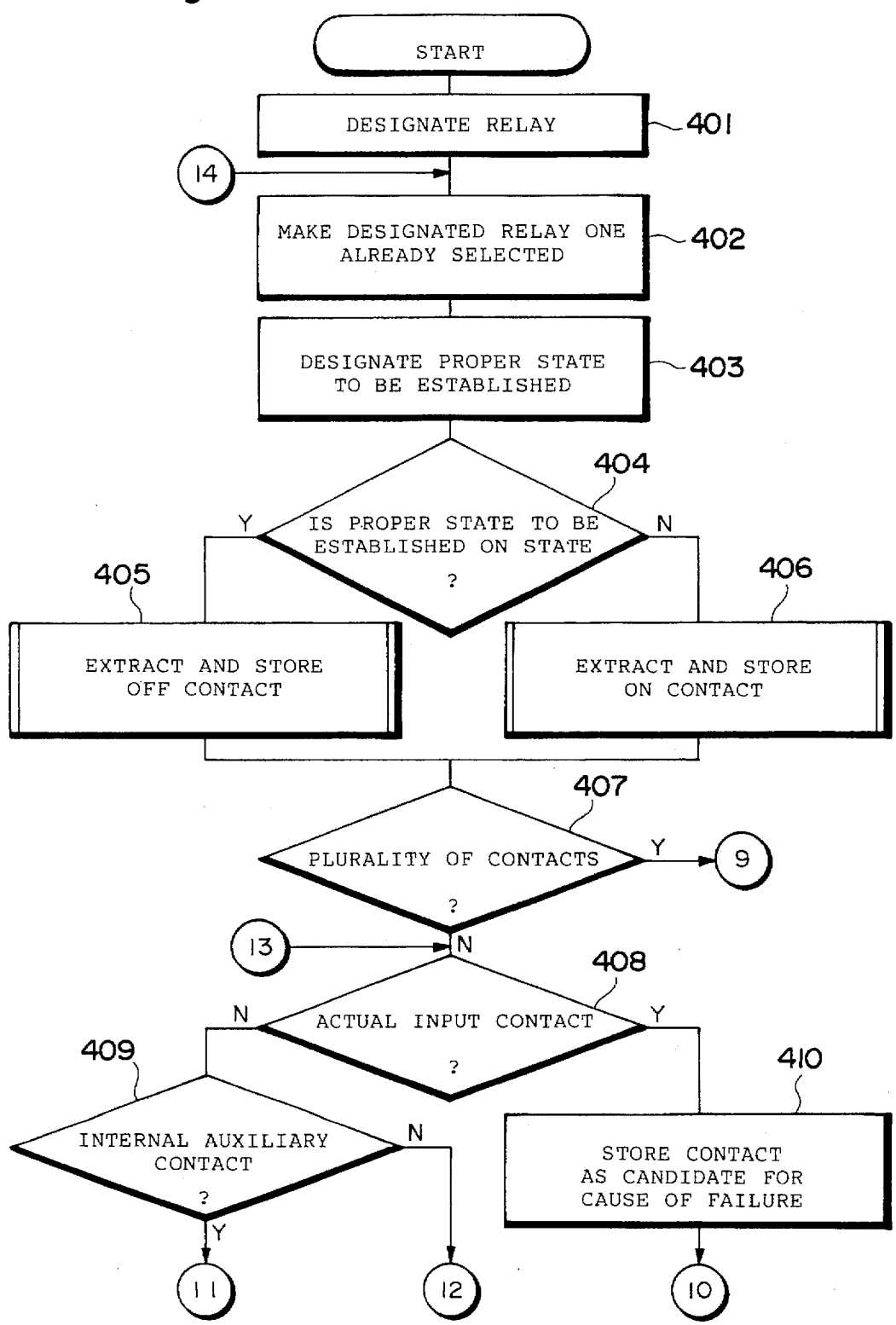
FIGS. 11 and 12 are flowcharts illustrating the flow of processing for automatically selecting contacts that possibly are faulty in ladder program.
Figure 12:
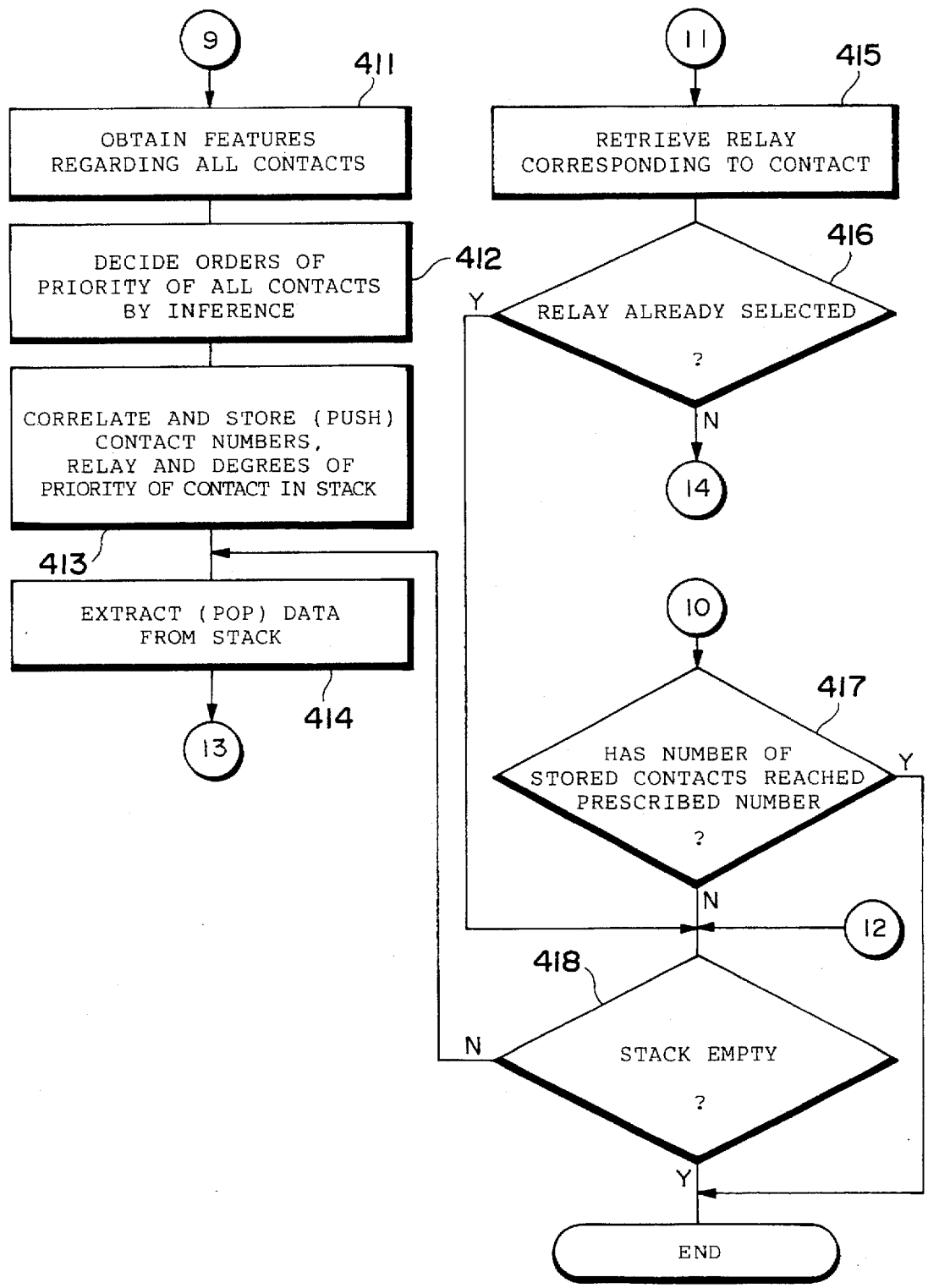

FIGS. 11 and 12 are flowcharts showing the flow of processing for automatically selecting a contact. As one example, a case will be considered in which the relay 110 (drill descent) in FIG. 4 is in the OFF state regardless of the fact that it should be ON.

The user specifies the actuator which does not perform the prescribed operation in the controlled system 3 and specifies the relay 110 corresponding to this actuator in the ladder program.

The user enters the information (the relay number, etc.) designating the specified relay into the fault detecting apparatus 1 using the keyboard 14 (step 401). The CPU 11 stores the designated relay number in the RAM 13. Further, the fact that the designated relay 110 has been selected is written in the RAM 13 by the CPU 11 (step 402). For example, a flag indicating that this relay has been selected is prepared in the RAM 13 and this flag is set.

Next, using the keyboard 14, the user enters into the fault detecting apparatus 1 whether the proper state that is to be established at the relay 110 is the ON state or OFF state (the ON state in this example) (step 403). This state also is stored in the RAM 13 by the CPU 11.

If the relay 110 is in the OFF state regardless of the fact that it is originally intended to be in the ON state (YES at step 404), then an OFF contact among the contacts that have been connected to the designated relay is extracted and stored in the RAM 13 (step 405). If the designated relay is in the ON state regardless of the fact that it is originally intended to be in the OFF state (NO at step 404), then an ON contact that is the cause of this condition is extracted from among the contacts that have been connected to the designated relay, and this contact is stored in the RAM 13 (step 406). This processing is similar to that of FIGS. 7 to 10 described above.

Assume that contacts 107, 209 and 013 have been extracted and stored in the RAM 13 by the processing of step 405. Since a plurality of contacts have been stored in the RAM 13 (YES at step 407), the features (described in detail later) of these contacts that have been stored in the RAM 13 are obtained (step 411). Inferential processing is applied to each of these contacts on the basis of these features and the degree of priority (described in detail later) is determined (step 412).

The numbers of the contacts, the relay to which these contacts have been connected and the degrees of priority of these contacts are correlated and stored (pushed) in a stack within the RAM 13 (step 413).

Figure 13A:
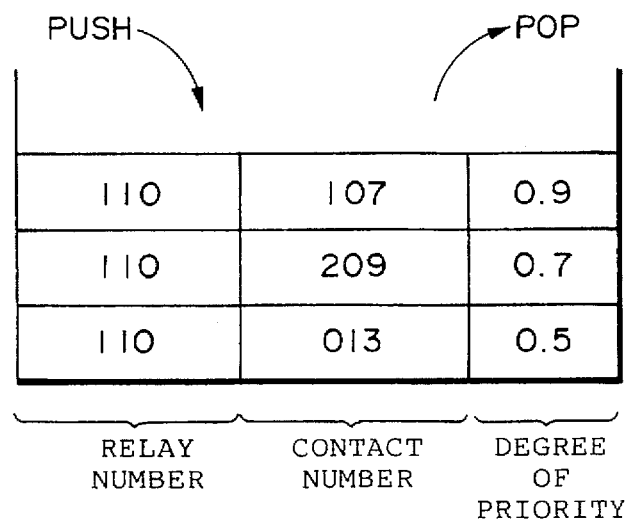
FIGS. 13a through 13c show the structure of a stack.

FIG. 13a illustrates the data thus stored in the stack. As shown in FIG. 13a, it is assumed that the degrees of priority of the contacts 107, 209 and 013 are 0.9, 0.7 and 0.5, respectively. Further, data having smaller values of degree of priority are stacked at the bottom and data having higher values of degree of priority are stacked at the top. In other words, the items of data are pushed onto the stack in regular order from the data having smaller values of degree of priority.

Figure 13B:
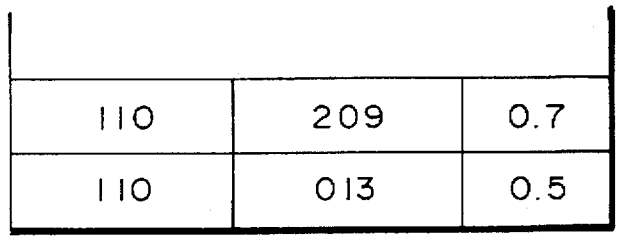

Next, the data that has been stored in the stack is popped (step 414). That is, the contact 107 having the highest degree of priority among the contacts stored in the stack is extracted. As a result, the data of contacts 209 and 013 remain in the stack of RAM 13, as illustrated in FIG. 13b.

Next, it is determined whether the extracted contact 107 is an actual input or not (step 408). Since the contact 107 is not an actual input contact (NO at step 408), it is determined whether the contact 107 is an internal auxiliary contact (step 409). Since the contact 107 is an internal auxiliary contact (YES at step 409), the relay 107 that controls the state of this contact is retrieved (step 415).

It is then determined whether the retrieved relay 107 has already been selected (step 416). In a case where the relay 107 has already been selected (YES at step 416), the contact connected to the relay 107 is one that has already been investigated and therefore is not investigated here.

In a case where the relay 107 has not been selected (NO at step 416), processing from step 402 is repeated in order to carry out processing regarding contacts that have been connected to the relay 107. The contact 205 is the only contact connected to the relay 107. Assume that the contact 205 is in the OFF state. The contact 205 is extracted and stored in the RAM 13 at step 405.

The contact stored in the RAM 13 is solely the contact 205 (NO at step 407) and this relay is an internal auxiliary contact (NO at step 408 and YES at step 409). Accordingly, the relay 205 that controls the state of the contact 205 is retrieved, the OFF contacts connected to the relay 205 are extracted and these contacts are stored in the RAM 13 (steps 402 to 405).

Figure 13C:
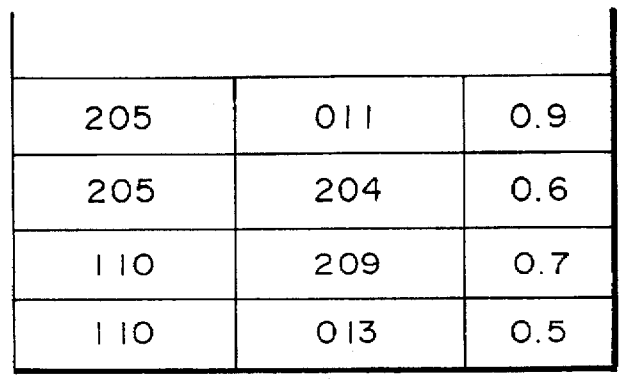

Assume here that the contacts stored in the RAM 13 are the contacts 011 and 204, and that the degrees of priority of these contacts are 0.9 and 0.6, respectively. In this case, the stack of RAM 13 is as shown in FIG. 13c owing to the processing of step 413.

Next, the data of contact 011 is popped from the stack (step 414). Since this contact is an actual input contact (YES at step 408), the contact 011 is stored in RAM 13 as a candidate for cause of failure (step 410).

It is then determined whether the number of contacts stored as candidates for cause of failure has reached a predetermined prescribed number (step 417). This prescribed number is entered into the fault detecting apparatus 1 beforehand by the user. This is to arrange it so that processing for detecting candidates for cause of failure will be terminated in a case where the prescribed number of contacts has been selected.

Next, it is determined whether the stack is empty, i.e., whether there is no data that will pop from the stack (step 418). Since there is data relating to the contacts 204, etc., in the stack, processing is repeated from step 414.

In a case where it has been determined at step 417 that the contacts stored as candidates for cause of failure is of the prescribed number, or in a case where it has been determined at step 418 that the stack is empty, processing ends.

In a case where the designated contact is not an internal auxiliary contact (e.g., is a special auxiliary contact) (NO at step 409), this contact is not related to detection of failure of a detector and therefore is not processed. Processing is then repeated from step 418.

It should be noted that storage of contacts may of course be performed by another data structure without relying upon a stack.

(2-2) Contact features

The above-mentioned features are as follows:

[Feature 1] Nature of contact

The nature of a contact indicates that the contact is an actual input contact (J), an internal auxiliary contact or a special auxiliary contact (T).

[Feature 2] Position of contact in ladder circuit

The position of a contact in a ladder circuit is the order indicating the number of the contact counting from the bus-line R of the ladder circuit. For example, in FIG. 14, contact 02 is situated at the second position counting from the bus-line R, and therefore the position of this contact in the ladder circuit is 2. The position of contact 05 in the ladder circuit is 1.

[Feature 3] Form of connection of contact

The form of a contact connection indicates whether the contact is (A) serially connected or (O) parallel connected. For example, in FIG. 14, contacts 01, 02 and 03 are serially connected and therefore the form of the connection of these contacts is serial. On the other hand, contact 05 is not a contact serially connected to its neighbor but is connected in parallel with contacts 01, 02 and 03 and with contacts 06 and 07. Accordingly, the form of connection of contact 05 is parallel.

[Feature 4] Type of contact

Contact type indicates whether the contact is an a contact (a) or a b contact (b).

[Feature 5] Number of rungs to actual input contact

The number of rungs to an actual input contact may be understood as follows: By way of example, in order to start from contact 09, which is an internal auxiliary contact in FIG. 14, and reach contact 04, which is an actual input contact that influences the state of the contact 09, the two rungs of the individual ladder circuits L02 and L01 must be traversed. Accordingly, the number of rungs from contact 09 to the actual input contact is two.

[Feature 6] Remaining number of contacts for relay to attain normal state (ON or OFF state)

Figure 14:
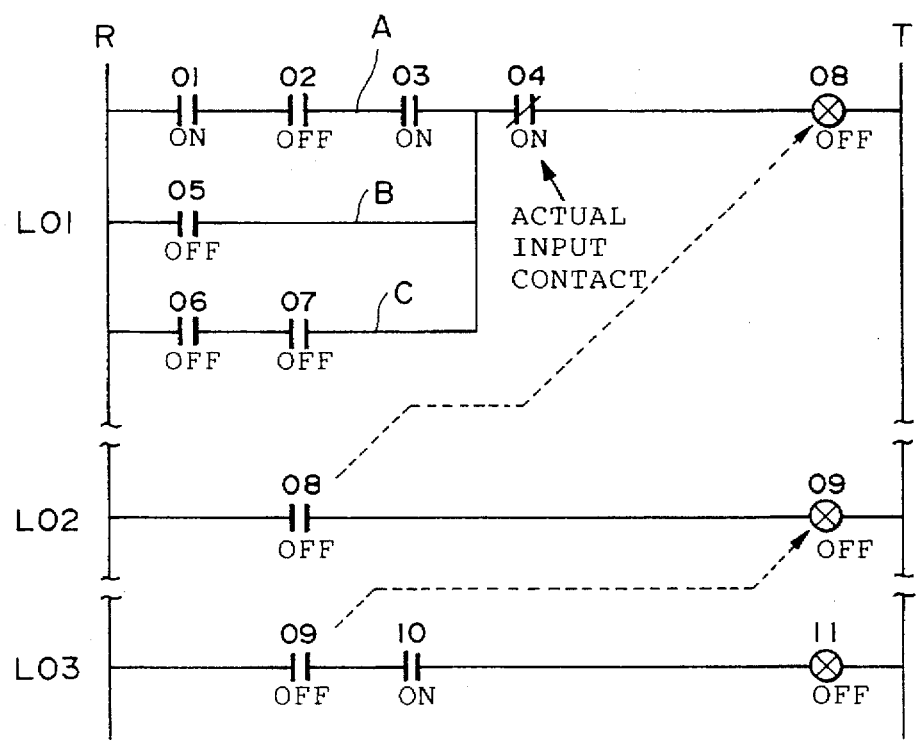
FIG. 14 is a ladder diagram showing an example of a ladder program.

By way of example, in a case where relay 08 in the individual ladder circuit L01 of FIG. 14 is in the OFF state regardless of the fact that it should be ON, the relay 08 will attain the ON state if contact 02 in line A attains the ON state. In this case, therefore, with regard to contact 02, the number of contacts that remain in order for the relay to attain the normal state is one.

Similarly, with regard to contacts 06 and 07, relay 08 will attain the ON state if these two contacts do, and therefore the remaining number of contacts with regard to each of contacts 06 and 07 is two. The remaining number of contact with regard to contact 05 is one.

In a case where degree of priority of a contact is obtained, any one of these features may be used to obtain it or two or more features may be combined to obtain the degree of priority. Furthermore, features of contacts other than Features 1 through 6 may be used.

(2-3) Inferential processing

FIGS. 15a through 15f illustrate examples of membership functions of respective ones of Features 1 through 6.

FIG. 16a shows an example of rules in a case where the degree of priority of each contact is obtained by fuzzy reasoning. FIG. 16b shows an example of a membership function of degree of priority.

Rule 1 states that "If the position of the contact in the ladder circuit (Feature 2) is near the bus-line R (NB) and the type of the contact (Feature 4) is an a contact (a)" (antecedent), "then the degree of priority of this contact is made high (PB)" (consequent).

In other words, generally the more important the contact, the closer the contact is placed to the bus-line R. In addition, generally the influence exerted upon a change in the state of the relay connected to the a contact is greater than for that connected to the b contact. Therefore, the degree of priority of such a contact is made high and detection of this contact is performed preferentially.

Rule 2 states that "If the nature of the contact (Feature 1) is that it is an actual input contact (J)" (antecedent), "then the degree of priority of this contact is made high (PB)" (consequent).

This is for the purpose of preferentially detecting an actual input contact that is possibly faulty. In a case where the contact is an internal auxiliary contact, it is necessary to retrieve the relay corresponding to this contact and investigate the contacts connected to this relay. This investigation is time consuming. On the other hand, in a case where the contact is an actual input contact, it is unnecessary to retrieve another relay. Therefore, by investigating the actual input contact preferentially, the possibility that a faulty location can be detected in a short period of time is raised. Further, in a case where the contact is a special auxiliary contact, the influence exerted upon the relay to which this contact is connected is considered to be small and the need to investigate this contact preferentially is considered to be less in comparison with the actual input contact.

Rule 3 states that "If the form of the connection of the contact (Feature 3) is serial (A) and the number of remaining contacts necessary for the relay to attain the normal state (ON or OFF state) (Feature 6) is small (NB)" (antecedent), "then the degree of priority of this contact is made high (PB)" (consequent).

Figures 17A, 17B:
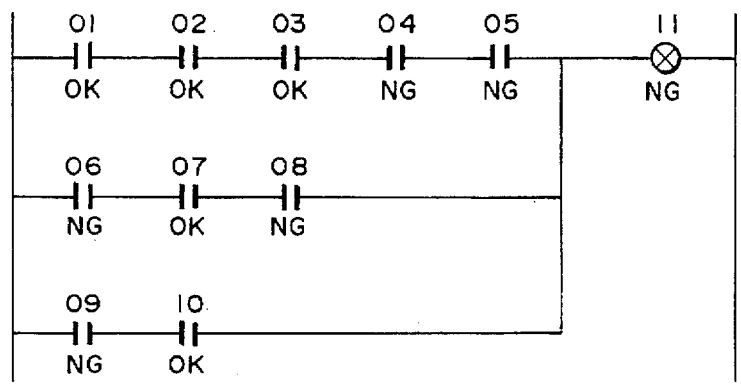

For example, assume that contacts which are candidates for cause of failure (NG) are contacts 04, 05, 06, 08 and 09 in FIGS. 17a and 17b. All of these contacts fall under a series connection (A). However, with regard to the number of remaining contacts necessary for the relay to attain the normal state, the smallest is one in case of contact 09. According to Rule 3, therefore, contact 09 is given the highest degree of priority.

Rule 4 states that "If the nature of the contact (Feature 1) is that it is an internal auxiliary contact (N) and the position of the contact in the ladder circuit (Feature 2) is far from the bus-line R (PB)" (antecedent), "then the degree of priority of this contact is made low (NB)" (consequent).

In the ladder circuit, generally an unimportant contact is placed far from the bus-line R. Moreover, in case of an internal auxiliary contact, it is necessary to retrieve the relay that corresponds to this contact. Accordingly, the degree of priority of this contact declines.

Rule 5 states that "If the form of the connection of the contact (Feature 3) is parallel (O) and the number of rungs to the actual input contact influencing this contact (Feature 5) is neither large nor small but medium (ZR)" (antecedent), "then the degree of priority of this contact is made somewhat low (NS)" (consequent).

In a case where a contact is connected in parallel with another contact, there is a possibility that the first-mentioned contact is not the cause of failure but that the other contact connected in parallel therewith is the cause of the failure. Further, if the number of rungs to the actual input contact is a medium value, the degree of priority is lowered somewhat since some time is required to retrieve the actual input contact.

Rule 6 states that "If the type of the contact (Feature 4) is the b contact (b) and the number of remaining contacts necessary for the relay to attain the normal state (ON or OFF state) (Feature 6) is large (PB)" (antecedent), "then the degree of priority of this contact is made low (NB)" (consequent).

The reason for this is that generally the influence exerted upon the relay to which a contact is connected is smaller for the b contact than for the a contact. Further, if the number of remaining contacts for the relay to attain the normal state is large, the possibility that another contact is causing the failure is high and time is required to retrieve an actual input contact for which the possibility of failure is high.

Rule 7 states that "If the number of rungs to an actual input contact (Feature 5) is large (PB) and the number of remaining contacts necessary for the relay to attain the normal state (ON or OFF state) (Feature 6) is medium (ZR)" (antecedent), "then the degree of priority of this contact is made somewhat low (NS)" (consequent).

The reason for this is that if the number of rungs traversed to reach the actual input contact is large, time is required to reach the actual input contact for which the possibility of failure is high. In addition, if the number of remaining contacts for the relay connected to this contact (Feature 6) to attain the normal state is medium, not that much time is needed to retrieve the actual input contact for which the possibility of failure is high.

Rule 8 states that "If the position of the contact in the ladder circuit (Feature 2) is near the bus-line R (NB) and the number of rungs to the actual input contact (Feature 5) is small (NB)" (antecedent), "then the degree of priority of this contact is made somewhat high (PS)" (consequent).

The reason for this is that the more important the contact, the closer the contact is placed to the bus-line R in the ladder circuit. In addition, if the number of rungs to the actual input contact is small, not that much time is needed to retrieve the actual input contact for which the possibility of failure is high.

The degrees of membership of the antecedents of these rules are obtained by the membership functions of Features 1 through 6 shown in FIGS. 15a through 15f. The degrees of membership of the consequents are obtained with regard to each of PB to NB in FIG. 16b on the basis of the degrees of membership of the antecedents. The degree of priority of a contact is obtained as the weighted mean value of the membership function of FIG. 16b.

By way of example, if it is assumed that the values of Features 1 through 6 of contact 09 are as shown in FIG. 17b, then the degree of priority of contact 09 is obtained in the manner described below.

Figures 18A, 18B:
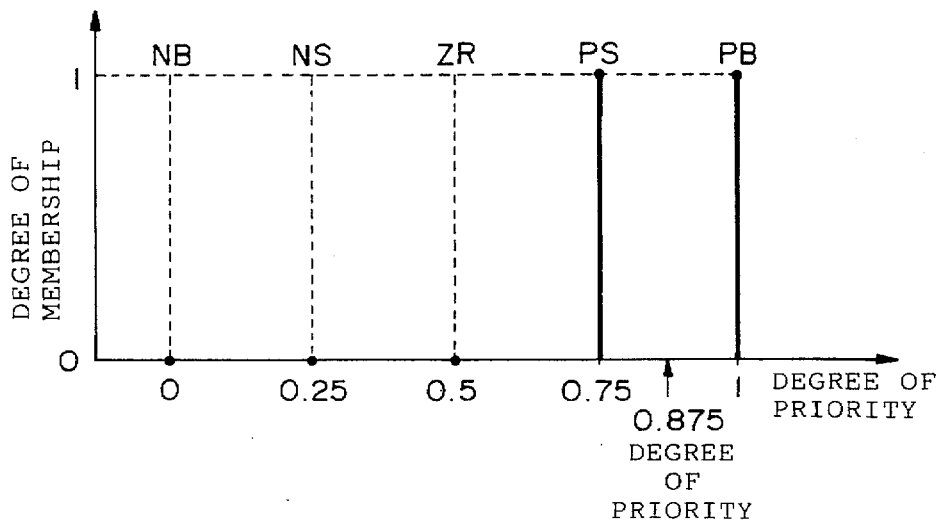
FIG. 18a illustrates degrees of membership of antecedents and consequents in a case where fuzzy reasoning is performed with regard to the contacts of FIG. 17a, and FIG. 18b illustrates degrees of priority of the contacts obtained by fuzzy reasoning.

FIG. 18a shows the result of obtaining the degrees of membership of antecedents and consequents in a case where Rules 1 through 8 are applied to contact 09.

Figure 15A:
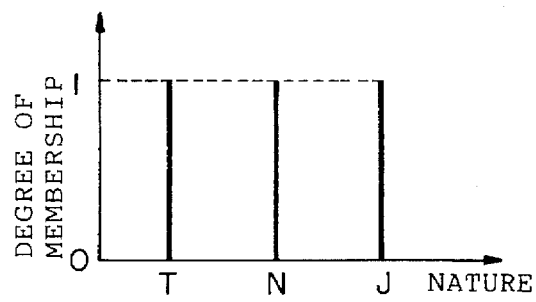
FIGS. 15a through 15f show membership functions of contact features 1 through 6.
Figure 15B:
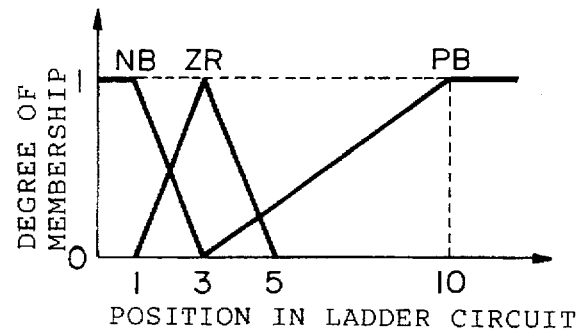
Figure 15C:
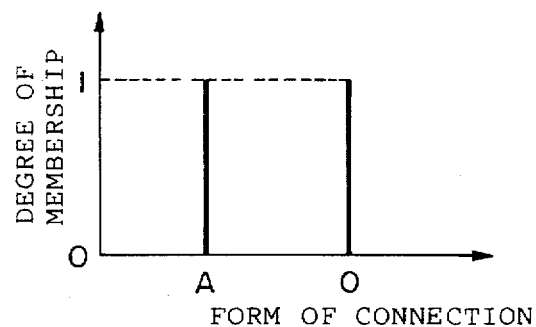
Figure 15D:
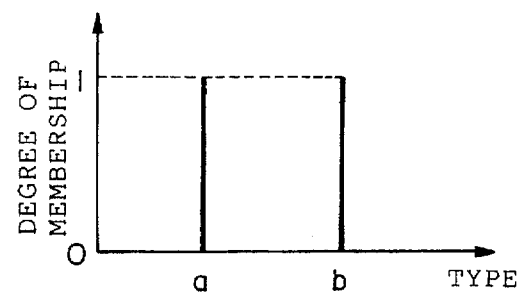
Figure 15E:
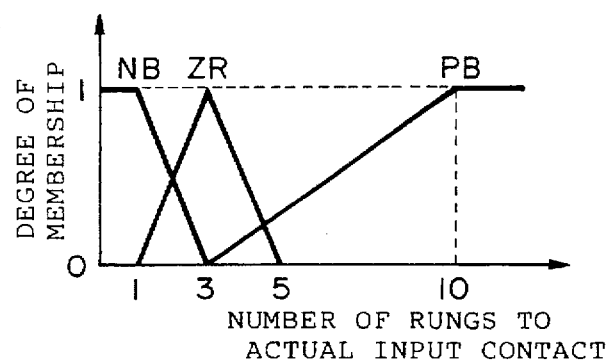
Figure 15F:
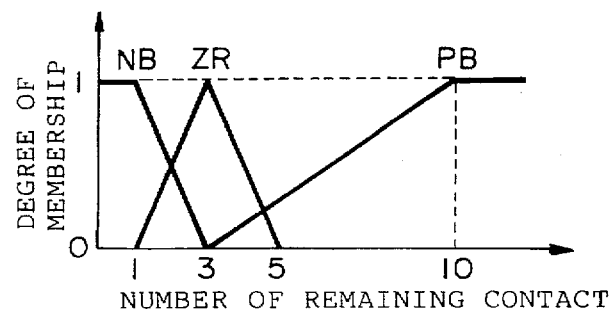

Since the value of Feature 6 of contact 09 is 1 (FIG. 17b), the degree of membership NB of Feature 6 is equal to 1 in accordance with the membership function of FIG. 15f. Further, since contact 09 is an a contact, the degree of membership of Feature 4 is 1. Accordingly, the degree of membership of the antecedent of Rule 1 becomes 1 by taking the AND between the degree of membership of Feature 6 and the degree of membership of Feature 4. As a result, the degree of membership for which the degree of priority in the consequent is PB is 1.

Similarly, the degree of membership of the antecedent of Rule 2 is 0 and the degree of membership for which the degree of priority in the consequent is PB is 0. The degree of membership of the antecedent of Rule 3 is 1 and the degree of membership for which the degree of priority in the consequent is PB is 1. Accordingly, for Rules 1 to 3 overall, the degree of membership for which the degree of priority is PB is 1.

The degree of membership of the antecedent of Rule 4 is 0 and the degree of membership for which the degree of priority in the consequent is NB is 0. The degree of membership of the antecedent of Rule 6 is 0 and the degree of membership for which the degree of priority in the consequent is NB is 0. Accordingly, the degree of membership for which the degree of priority is NB is 0.

In accordance with Rules 5 and 7, the degree of membership for which the degree of priority is NS is 0.

The degree of membership of the antecedent of Rule 8 is 1 and the degree of membership for which the degree of priority in the consequent is PS is 1.

Accordingly, as shown in FIG. 18b, the degrees of membership for which the degrees of priority are NB and NS are 0, and the degrees of membership for which the degrees of priority are PS and PB are 1. The degree of priority, which is obtained as the weighted mean of these values, is 0.875, where we let 0 represent the degree of membership for which the degree of priority is ZR.

As for another example, when the degree of priority of contact 06 is obtained in the same manner, the degree of priority of contact 06 is 0.75.

Rules 1 to 8 have been cited as one example of rules in fuzzy reasoning. However, rules other than these may be used if the rules allow appropriate reasoning to be performed. In addition, other rules and the above-mentioned Rules 1 to 8 may be used in combination.

Of course, rather than performing fuzzy reasoning, it is possible to obtain only Feature 1 with regard to each contact and preferentially investigate only actual input contacts. Only Feature 2 may be obtained with regard to each contact, and investigation can be performed preferentially starting from contacts at positions closest to the bus-line R.

(3) Processing for detecting faulty actuators

Figure 19:
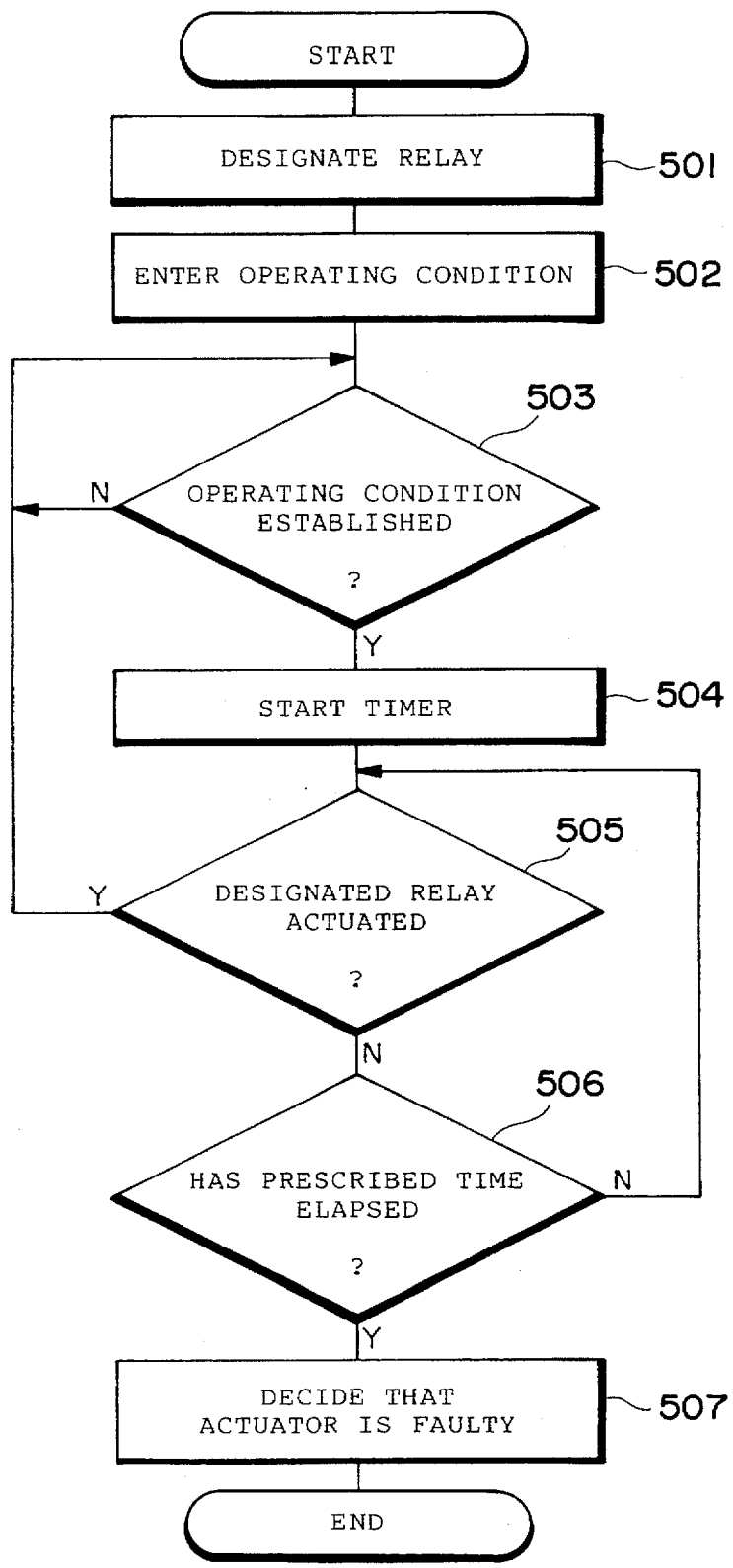
FIG. 19 is a flowchart showing the flow of processing for detecting failure of an actuator.

FIG. 19 is a flowchart illustrating the flow of processing through which the fault detecting apparatus 1 detects failure of an actuator in the controlled system 3.

A user specifies an actuator that is the object of fault detection among the actuators in the controlled system 3 and enters information (e.g., the relay number), which specifies the relay corresponding to this actuator, into the fault detecting apparatus 1 using the keyboard 14 (step 501). All actuators of the controlled system 3 can be made the object of fault detection.

Further, using the keyboard 14, the user enters a requirement as to the kind of condition that must be established for the designated relay (actuator) to be turned ON or OFF (actuated), as well as what is the normal state (ON or OFF) that should be attained by the relay if the condition is established (step 502). An example of the condition is the ON or OFF state of a contact. Alternatively, though the details will be described later, the necessary condition can be written in the ladder program in advance.

In a case where the ON or OFF state of a contact has been designated as the condition by the user, and when the controlled system 3 starts operating, the CPU 11 of the fault detecting apparatus 1 refers to the I/O table in the RAM 23 of the PLC 2 to monitor whether the ON or OFF state (the operating condition) of the designated contact has been established (step 503).

In a case where the operating condition has been established (YES at step 503), a timer is started (step 504). The time in the timer also is set by the user in advance.

Next, whether the designated relay is in normal state (has been actuated) is determined by the CPU 11 (step 505). In a case where the designated relay has been actuated (YES at step 505), this means that the designated relay (as well as the actuator to which the signal from this relay is applied) is operating normally. The CPU 11 repeats processing from step 503 in order to monitor whether actuation of another designated relay (actuator) or the next actuation of the same relay is performed normally or not.

If the designated relay is not operating (NO at step 505), then it is determined whether the prescribed period of time set in the timer has elapsed (step 506). If the prescribed time period has not elapsed (NO at step 506), then it is again determined whether the relay has started operation (step 505). If the relay does not start operating even upon elapse of the prescribed time period (YES at step 506), a decision is rendered to the effect that the relay (as well as the actuator to which the signal from the relay is applied) is faulty (step 507). The fact that the designated actuator is faulty is displayed on the display unit 15 to so inform the user.

Figure 20:
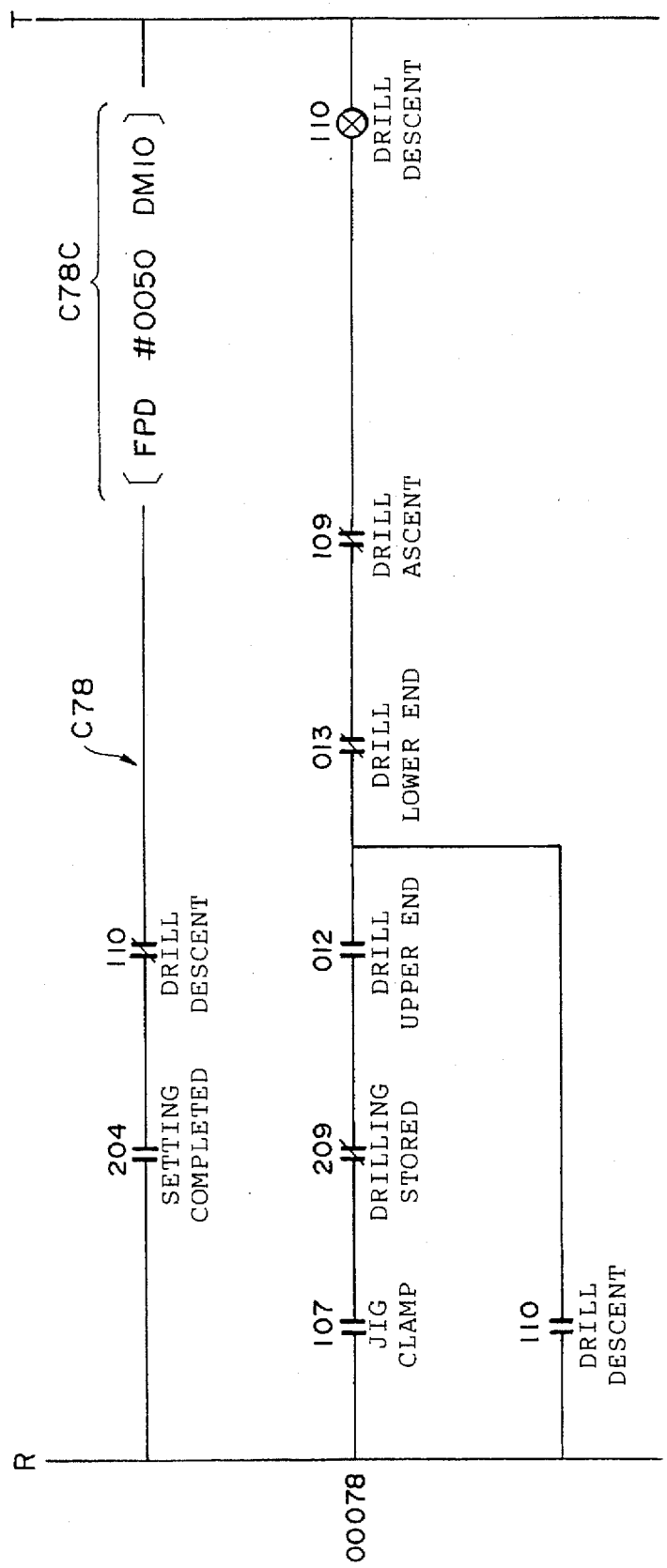
FIG. 20 is a ladder diagram illustrating an example of a ladder program to which a function for detecting failure of an actuator has been added.

FIG. 20 illustrates another example in which actuator failure is detected. As mentioned above, the necessary condition is written in the ladder program to add the actuator fault-detecting function to the ladder program.

In the ladder program, an individual ladder circuit C78 including an application instruction C78C, a contact 110 and a contact 204 is inserted ahead of address 00078 in FIG. 4. A ladder circuit containing an application instruction is inserted by the user in advance when the user creates the ladder program.

The actuator designated as an object of investigation is the actuator to which the relay output from the relay 110 (drill descent) is applied. Assume here that the relay 110 turns ON within a time period of less than 45 seconds from the moment the contact 204 turns ON in the normal operating state.

The application instruction C78C is composed of a command portion (FPD), a timer portion (#0050) and a message portion (DM10).

The content of processing according to the application instruction is described in the command portion. For example, processing is described to the effect that if the application instruction has attained the ON state, the timer is started and the message written in the message portion is issued upon elapse of the time period set in the timer.

The time to be counted by the timer is written in the timer portion. Here "#0050#" means 50 seconds.

The message issued from the application instruction is written in the message portion. The message includes the number of the relay undergoing monitoring, a message written by the use at will, etc.

The application instruction C78C attains the ON state to start the timer when the contacts 204 and 110 turn ON, and attains the OFF state to stop the timer when the contact 204 or 110 or both turns OFF.

In a case where the contacts 204 and 110 are in the ON state even if the time (50 seconds) set in the timer portion elapses from start of the timer, the application instruction C78C outputs the message that has been stored in the message portion DM10. This message is sent to the fault detecting apparatus 1, where it is displayed on the display unit 15.

More specifically, in a case where the relay 110 is OFF and the contacts 110 and 204 are ON, the timer of the application instruction C78C is started. In the normal state, the relay 110 turns ON within 45 seconds from the moment the contact 204 turns on, as mentioned above. Therefore, if the relay 110 turns on within 45 seconds, the contact 110 attains the OFF state, the timer of the application instruction C78C stops and a message is not issued.

On the other hand, if the relay 110 (actuator) causes a failure and does not attain the ON state even if the contact 204 turns ON, the contact 110 remains in the ON state and the timer continues running. The message is issued at elapse of 50 seconds. By including the number of the relay in the message, the user is capable of ascertaining that the relay 110 caused the failure.

Thus, whether a designated actuator is operating normally can be verified. If an actuator has failed, which actuator failed can be specified easily and quickly.

In this embodiment, the application instruction C78C is described immediately ahead of the relay 110, which is object of monitoring. By thus writing the application instruction adjacent the relay undergoing monitoring, it is unnecessary to designate the relay, which is the object of monitoring, in the application instruction. Accordingly, at creation of a ladder program, the relay that is the object of monitoring can be specified without checking whether designation of the relay is correct or not.

It should be noted that the ladder circuit C78 that includes the application instruction C78C can be written immediately after the relay 110 undergoing monitoring rather than immediately before it. Further, besides the output relay, an internal auxiliary relay, a timer or a counter, etc., can be adopted as the object monitored for detection of failure.

(4) Processing for detecting faulty actuators and detectors

The fault detecting apparatus 1 is capable of detecting failure of actuators and failure of detectors in concert. That is, the fault detecting apparatus can function as an overall fault detecting apparatus in which candidates for faulty locations can be detected easily and in a short period of time by combining both types of processing.

Figure 21:
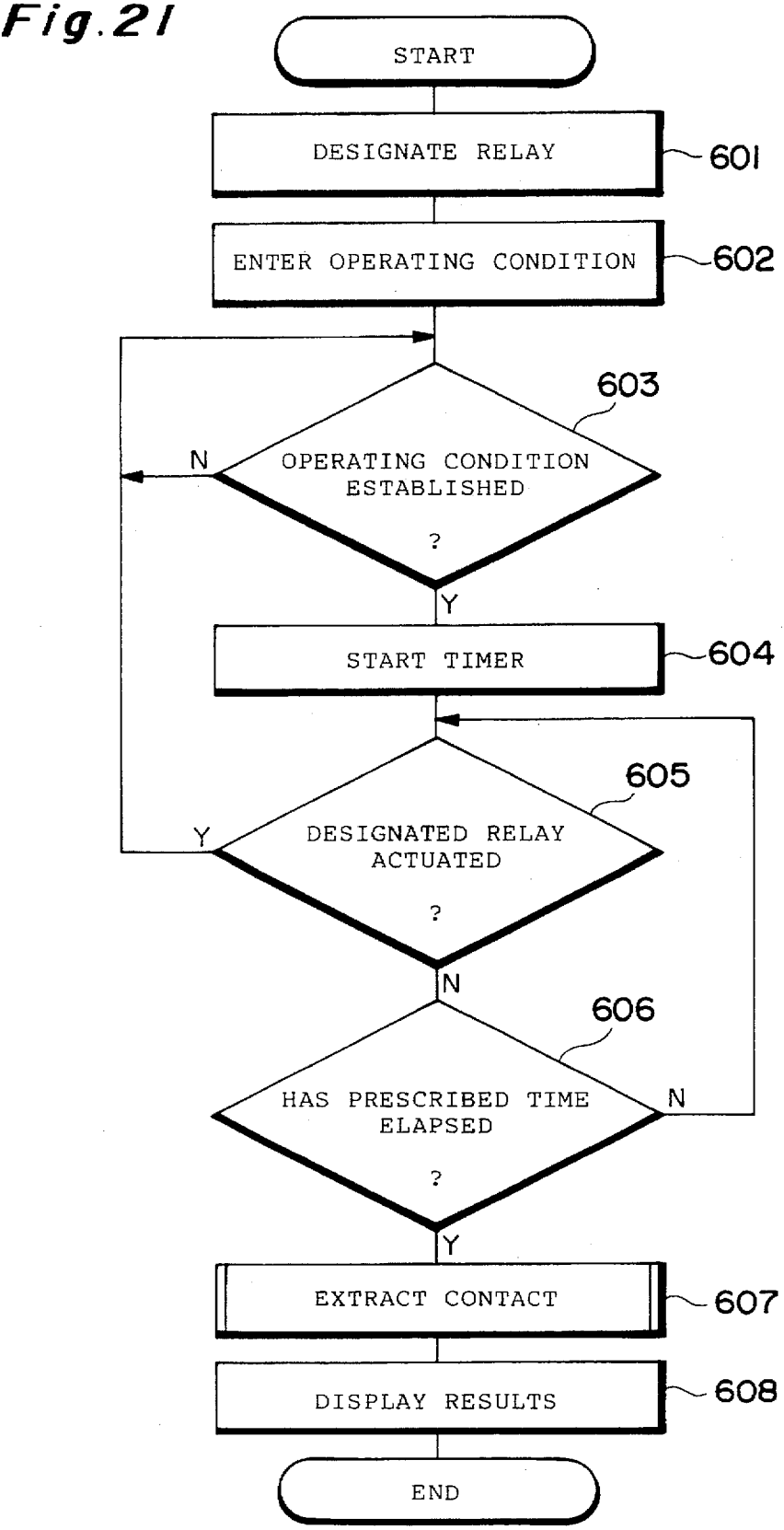
FIGS. 21 and 22 are flowcharts showing the flow of processing for detecting failure of an actuator and detector.

FIG. 21 is a flowchart illustrating the flow of processing through which the fault detecting apparatus 1 detects failure of an actuator and failure of a detector in concert.

The processing from step 601 to step 606 is the same as the processing from step 501 to step 506 in FIG. 19.

In a case where a designated relay (actuator) does not perform a prescribed operation even if the prescribed time set in the timer elapses (YES at step 606), candidates for contacts that have possibly failed are extracted by the CPU 11 from among the contacts connected to this actuator, and the extracted contacts are stored in the RAM 13 (step 607). The details of processing for extracting and storing the contacts are the same as the details of processing of steps 303 to 315 in FIGS. 5 and 6.

The contacts extracted by the CPU 11 and stored in the RAM 13 are displayed on the display unit 15 to inform the user (step 608). Processing is then terminated.

Thus, in processing for detecting failure of actuators and detectors, detection of abnormality of an actuator to detection of abnormality of the detector that is the cause can be performed collectively through a series of processing steps.

Figure 22:
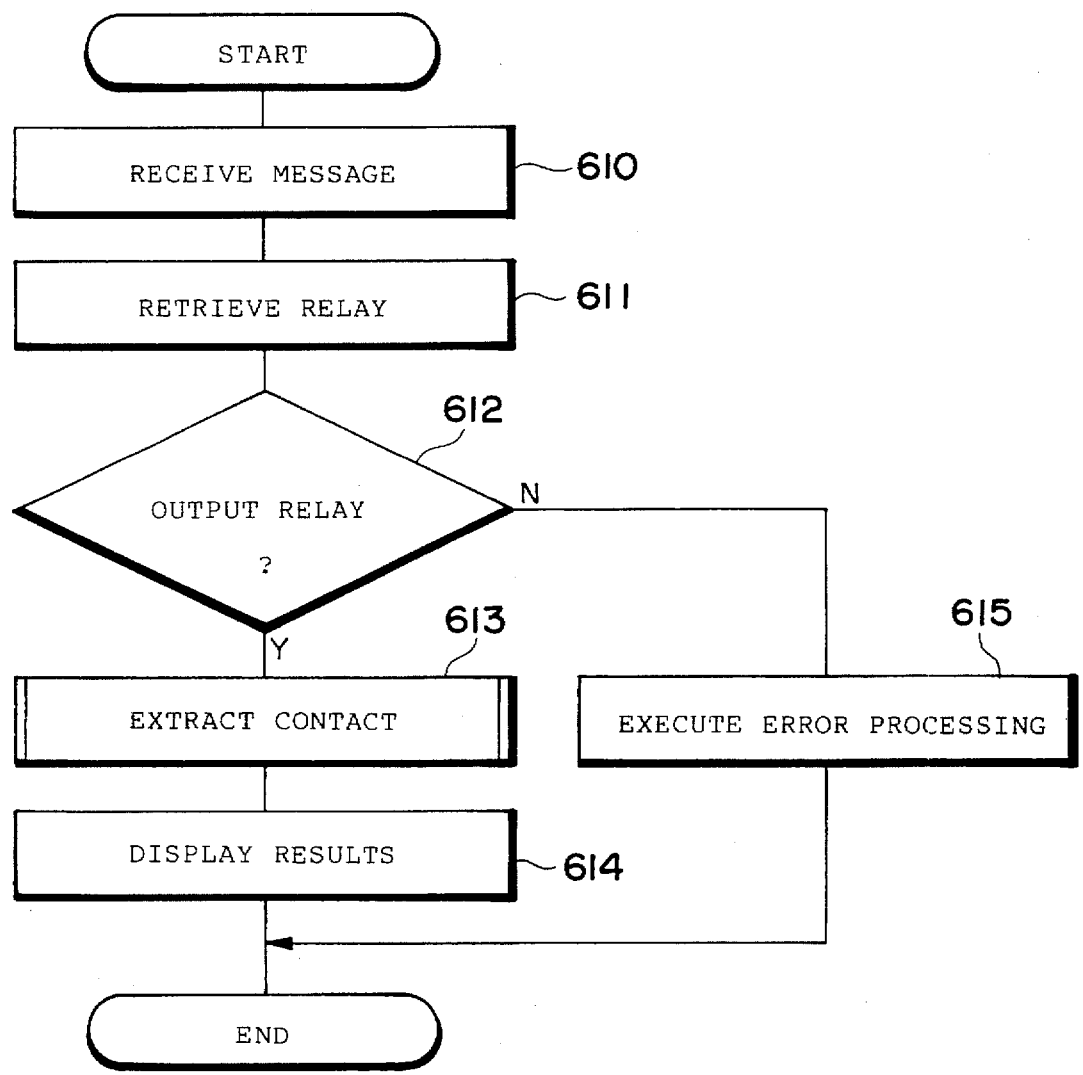

FIG. 22 is a flowchart showing the flow of processing for detecting failure of actuators and detectors in a case where an application instruction for performing actuator fault detection is written in a ladder program.

As mentioned above, the application instruction sends a message to the fault detecting apparatus 1 in a case where a prescribed relay does not perform a prescribed operation within a period of time set in a timer. The message includes the number of the relay being monitored by the application instruction.

Upon receiving the message from the PLC 2 (step 610), the CPU 11 retrieves the relay of the ladder program on the basis of the number of the relay contained in the message (step 611).

The CPU 11 then determines whether the retrieved relay is an output relay (step 612).

In a case where the retrieved relay is an output relay (YES at step 612), the contacts connected to this relay are extracted and stored in the RAM 13 (step 613). Processing for extracting and storing the contacts is the same as the processing of steps 303 to 315 in FIG. 5 and 6.

The results of extracting the contacts are displayed on the display unit 15 to inform the user (step 614). Processing is then terminated.

In a case where the retrieved relay is not an output relay (NO at step 612), error processing is executed. Examples of relays that are not output relays are a retrieved relay that delivers a keep output and a retrieved relay that performs the four arithmetic operations.

An example of error processing is to display the retrieved relay on the display unit to inform the user of the fact that an error has occurred.

An internal auxiliary relay or a timer, counter, etc., can be included in the relay designated by the user at step 601 in FIG. 21 or in the relay adopted as the object of monitoring by the application instruction in FIG. 20.

Figure 23:
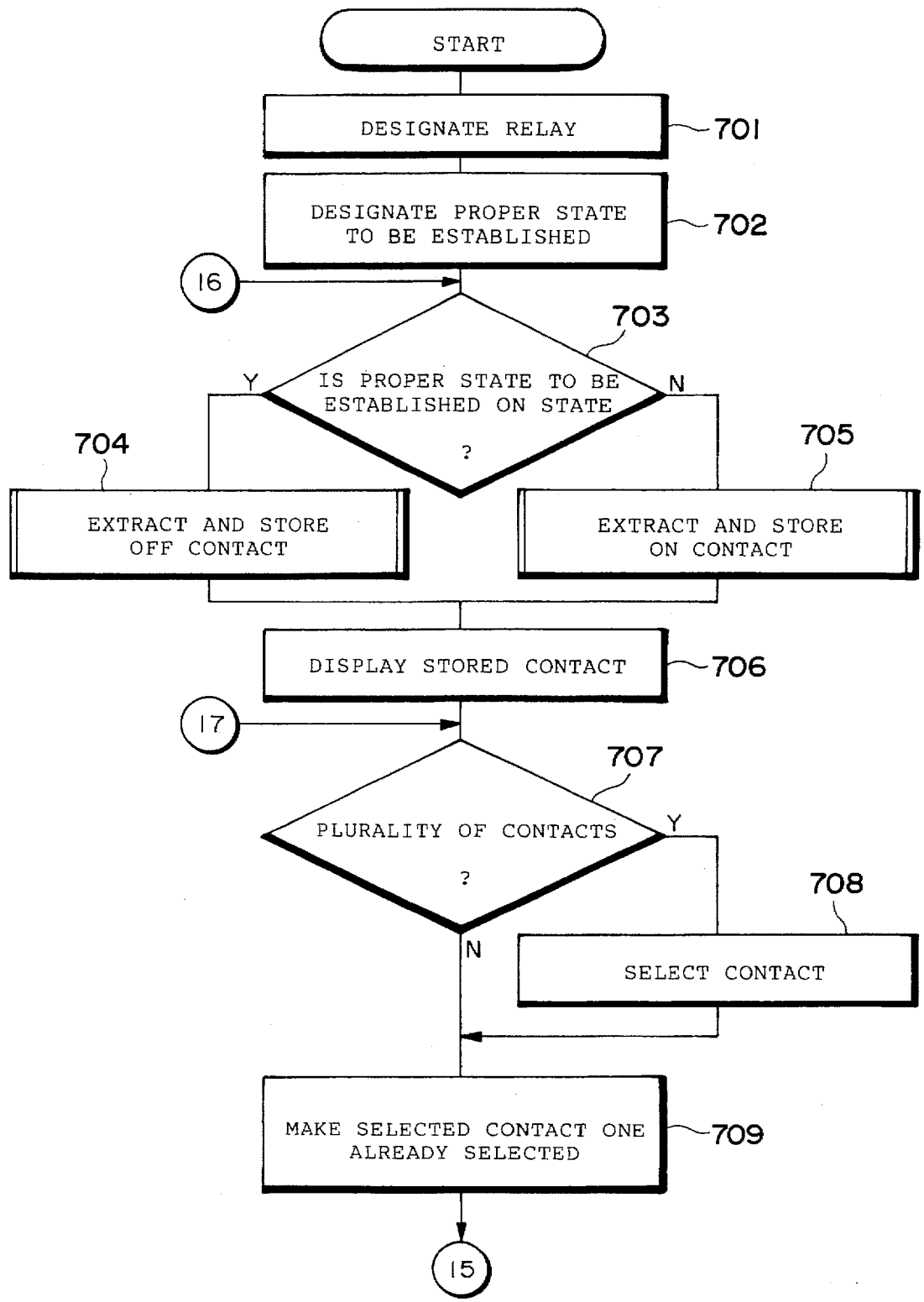
FIGS. 23 and 24 are flowcharts showing the flow of processing for detecting failure of internal auxiliary contacts and special auxiliary contacts or programming error.
Figure 24:
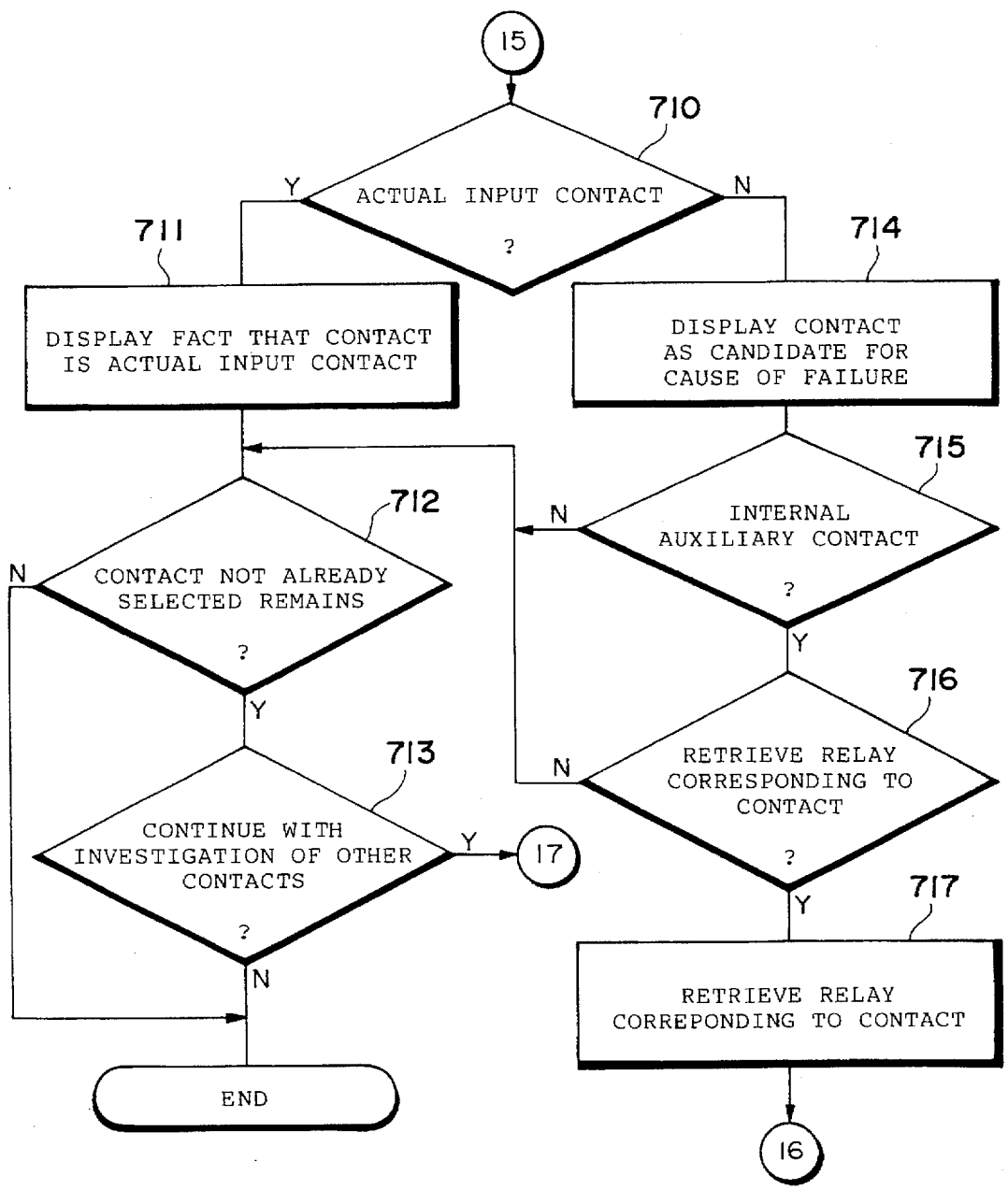

(5) Processing for detecting failure of internal auxiliary contacts and special auxiliary contacts or programming errors FIGS. 23 and 24 are flowcharts showing the flow of processing through which the fault detecting apparatus 1 detects failure (abnormality) of internal auxiliary contacts and special auxiliary contacts or a programming error in a ladder program.

As regards to internal auxiliary contacts and special auxiliary contacts, there are cases in which a programming error, such as misnumbering a contact, is made when the user creates the ladder program. There are also cases in which the ladder program contains so-called program bugs.

In the same manner as performed in the processing (FIG. 5) for detecting failure of detectors, information (e.g., relay number) designating a relay and whether the proper state that is to be established at the designated relay is the ON or OFF state are entered into the error detecting apparatus 1 (steps 701,702). The CPU 11 stores the entered information in the RAM 13.

If the designated relay is in the OFF state regardless of the fact that it is originally intended to be in the ON state (YES at step 703), then an OFF contact is extracted from among the contacts connected to the designated relay and this contact is stored in the RAM 13 (step 704). If the designated relay is in the ON state regardless of the fact that it is originally intended to be in the OFF state (NO at step 703), then an ON contact is extracted from among the contacts connected to the designated relay and this contact is stored in the RAM 13 (step 705). The details of the processing of step 704 is the same as in FIGS. 7 and 8, and the details of processing of step 705 is the same as in FIGS. 9 and 10.

All of the contacts extracted and stored in the RAM 13 are displayed on the display unit 15 to inform the user (step 706).

In a case where a plurality of contacts are displayed on the display unit 15 (YES at step 707), the user selects one contact from among the displayed contacts and the number of this contact is entered into the fault detecting apparatus 1 using the keyboard 14 (step 708). If one contact is displayed (NO at step 707), then this contact is selected automatically by the CPU 11.

The fact that the selected contact has been selected is written in the RAM 13 by the CPU 11 (e.g., a flag indicating that the selected contact has been selected is set) so that selection of the same contact will not occur in subsequent processing (step 709).

Next, it is determined whether the selected contact is an actual input contact (step 710). In a case where the selected contact is an actual input contact (YES at step 710), the fact that this contact is an actual input contact and not an internal auxiliary contact or special auxiliary contact is displayed on the display unit 15 to so inform the user (step 711).

In a case where the selected contact is not an actual input contact, i.e., in a case where the selected contact is an internal auxiliary contact or special auxiliary contact (NO at step 710), the fact that this contact is a candidate for cause of failure is displayed on the display unit 15 to so inform the user (step 714).

In a case where the selected contact is an internal auxiliary contact (YES at step 715), whether the output relay or internal auxiliary relay that controls the state of this contact is to be retrieved or not is entered by the user (step 716).

In case of retrieval (YES at step 716), the relay corresponding to this contact is retrieved (step 717) and processing from step 703 is repeated in order to extract the contacts connected to the retrieved relay.

In a case where the contact selected at step 715 is not an internal auxiliary contact, or in a case where retrieval is not carried out at step 716, the contacts that have been stored in the RAM 16 are investigated to see if there is a contact that has not been selected (step 712).

If an unselected contact resides in the RAM 13 (YES at step 712), then whether investigation regarding the unselected contact is to continue or not is entered by the user (step 713). If investigation is to continue, (YES at step 713), then processing is repeated from step 707; otherwise (NO at step 713), processing ends. Processing ends also in a case where unselected contacts do not remain in the RAM 13 (NO at step 712).

Processing from step 712 onward is executed even after the processing of step 711.

Thus, contacts that are candidates for failure of programming error can be extracted automatically with regard to internal auxiliary contacts and special auxiliary contacts. By displaying a candidate contact, the user can readily verify the abnormality or programming error pertaining to the contact.

In the processing for detecting internal auxiliary contacts and special auxiliary contacts as well, the selection of contacts at step 708 can be performed automatically in the order of degree of priority by obtaining the degree of priority through the above-described inferential processing with regard to each contact extracted. Further, rather than performing inferential processing, it is possible to obtain only features with regard to each contact and preferentially investigate only contacts (e.g., internal auxiliary contacts) having a certain feature.

(6) Example of application

As an example of application of processing for detecting detectors or of processing for detecting internal auxiliary contacts and special auxiliary contacts, a contact other than an internal auxiliary contact is extracted and stored. Contacts other than internal auxiliary contacts include actual input contacts, special auxiliary contacts and the above-mentioned link relays.

Figure 25:
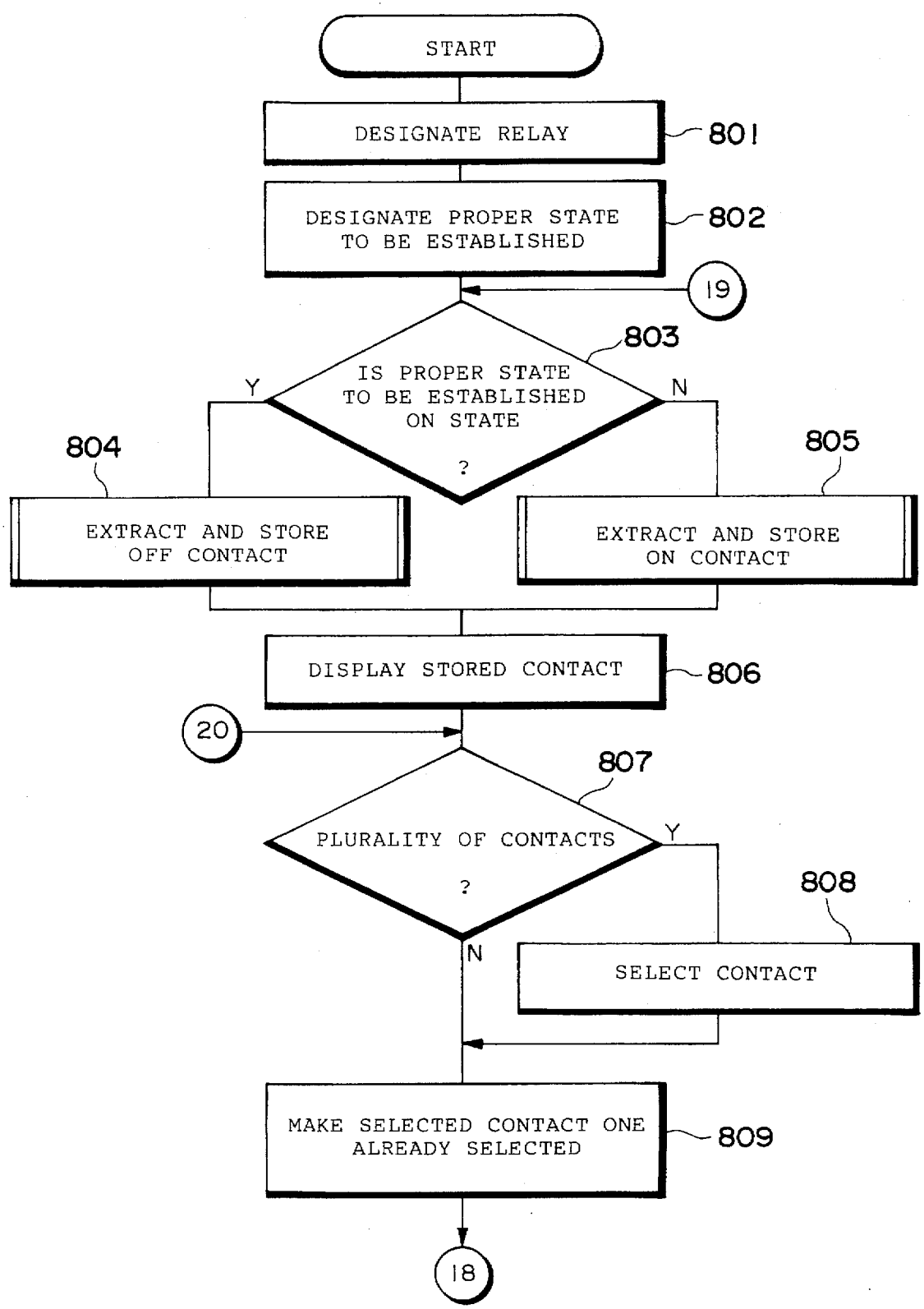
FIGS. 25 and 26 are flowcharts showing the flow of processing for extracting and storing contacts other than internal auxiliary contacts.
Figure 26:
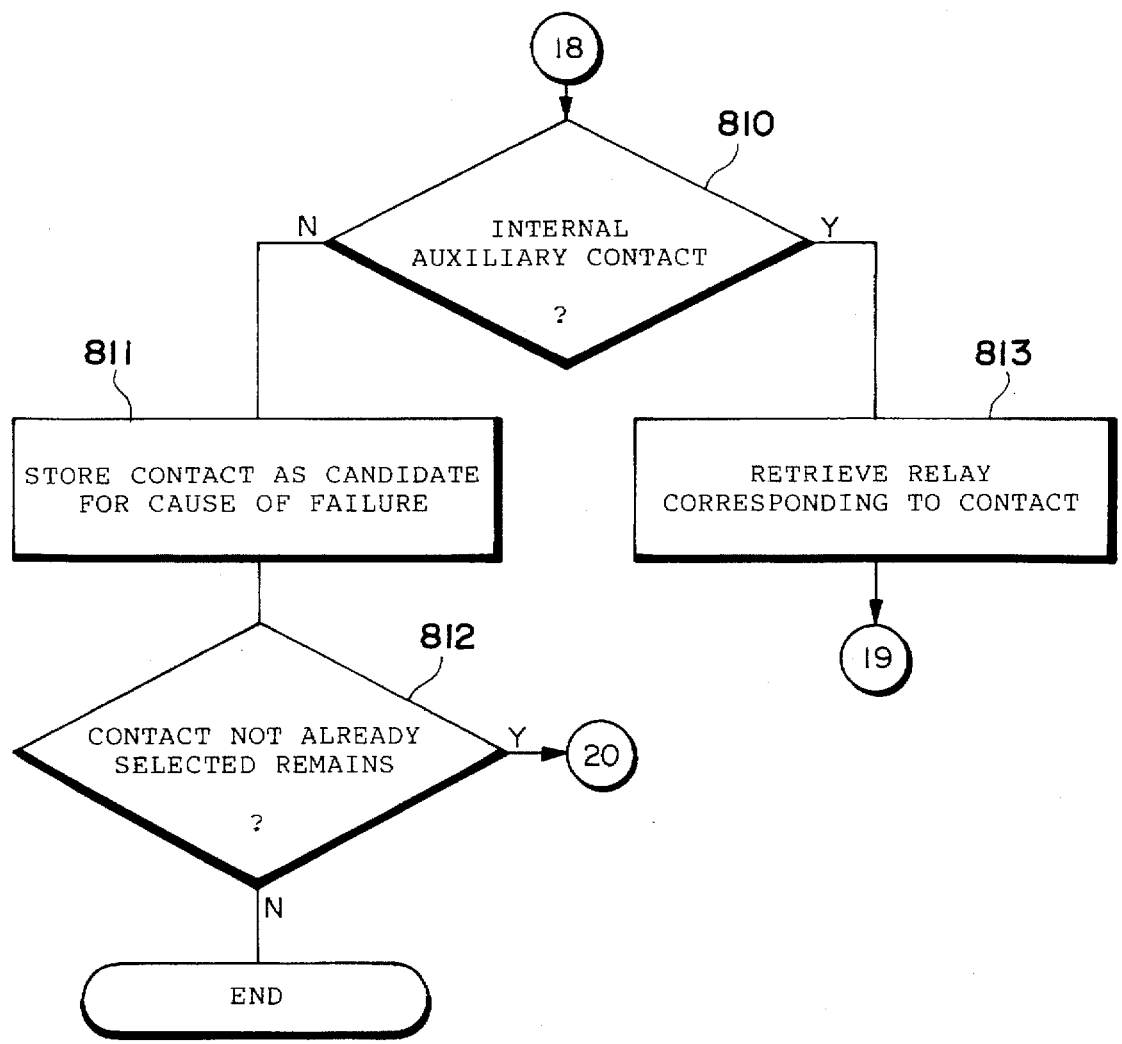

FIGS. 25 and 26 are flowcharts illustrating the flow of processing of this example of application.

The processing of steps 801 to 809 is the same as the processing of steps 301 to 309 in FIG. 5.

It is determined at step 810 whether a selected contact is an internal auxiliary contact. The determination as to whether a contact is an internal auxiliary contact can be performed by checking to see whether a relay having the same number as the contact is present in the ladder program, as set forth earlier. If a relay having the same number as the contact is present in the program, then this contact is an internal auxiliary contact.

In a case where the selected contact is an internal auxiliary contact (YES at step 810), the relay having the same number as this contact (the relay that controls the state of this contact) is retrieved (step 813) and processing is repeated from step 803 in order to investigate the contacts connected to the relay retrieved.

In a case where the selected contact is not an internal auxiliary contact (NO at step 810), this contact is stored in the RAM 13 as a candidate for cause of failure. It is then determined whether a contact not selected resides in the RAM 13 (step 812). If such a contact is present in the RAM, processing is repeated from step 807; otherwise, processing is terminated.

The selection of contacts at step 808 can be performed automatically in the order of degree of priority by obtaining the degree of priority through the above-described inferential processing with regard to each contact extracted. Further, rather than performing inferential processing, it is possible to obtain only features with regard to each contact and preferentially investigate only contacts (e.g., internal auxiliary contacts) having a certain feature.

Thus, it is also possible to detect abnormalities in special auxiliary contacts and link relays in addition to actual input contacts.

What is claimed is:

1. An apparatus for detecting a fault in a detector through a control apparatus, which controls a controlled system including one or two or more detectors and one or two or more actuators, having an input-signal memory for storing the state of an input signal from said detector, an auxiliary input-signal memory for storing the state of an input signal provided by an auxiliary-signal generator, an arithmetic-logic unit for generating an output signal to be applied to said actuator in accordance with predetermined logic in conformity with the states of the input signals stored in said input-signal memory, and auxiliary input-signal memory and an output-signal memory for storing the state of the output signal generated by said arithmetic-logic unit;

wherein when there is an actuator not operating normally in said controlled system, a dector that is possibly faulty in said controlled system is detected through said control apparatus, said apparatus for detecting the fault comprising:

a designation input unit for designating an identification code of an abnormal output signal corresponding to the actuator not operating normally;

an input-signal extractor for extracting an input signal that has influenced a logical operation, performed by said arithmetic-logic unit, which gave rise to the abnormal output signal designated by said designation input unit;

a determining unit for determining whether the input signal extracted by said input-signal extractor is the signal that has been stored in said input-signal memory; and a storage device which, if result of the determination by said determining unit is that the extracted input signal is the signal that has been stored in the input-signal memory, stores an identification code of this input signal.

2. The apparatus for detecting a fault in a detector according to claim 1, further comprising a display unit for displaying the identification code of the input signal that has been stored in said storage device.

3. The apparatus for detecting a fault in a detector according to claim 1, wherein in a case where the result of determination by said determining unit is that the extracted input signal is the signal that has been stored in the auxiliary input-signal memory and that it is controlled by the state of the output signal of the control apparatus, said input-signal extractor repeats extraction of the input signal that has influenced the logical operation, performed by said arithmetic-logic unit, which gave rise to the abnormal output signal that controls the state of said extracted input signal.

4. The apparatus for detecting a fault in a detector according to claim 3, further comprising a degree-of-priority calculator which, in a case where a plurality of input signals have been extracted, calculates a degree of priority of each input signal;

said input-signal extractor ending extraction processing when the number of input signals stored in said storage device becomes larger than a predetermined prescribed number or when there are no longer any input signals to be extracted; and in a case where extraction processing by said input-signal extractor has not ended, said determining unit performs the determination processing in regular order starting from the input signal for which the degree of priority is calculated to be high by said degree-of-priority calculator when a plurality of input signals have been extracted, and performs the determination processing with regard to one input signal when one input signal has been extracted.

5. The apparatus for detecting a fault in a detector according to claim 4, wherein said degree-of-priority calculator calculates a degree of priority by obtaining features of each extracted input signal and executing fuzzy reasoning based upon these features.

6. An apparatus for detecting a fault in a detector according to claim 1, wherein said control apparatus is constituted by a programmable logic controller;

the state of the input signal corresponds to the state of a contact of the programmable logic controller; and the state of said output signal corresponds to the state of a relay of the programmable logic controller.

7. The apparatus for detecting a fault in a detector according to claim 1, wherein said apparatus for detecting a fault in a detector is implemented by a computer system.

8. An apparatus for detecting a fault in an actuator through a control apparatus, which controls a controlled system including one or two or more detectors and one or two or more actuators, having an input-signal memory for storing the state of aninput signal from said detector, an auxiliary input-signal memory means for storing the state of an input signal provided by an auxiliary-signal generator, an arithmetic-logic unit for generating an output signal to be applied to said actuator in accordance with predetermined logic in conformity with the states of the input signals stored in said input-signal memory and auxiliary input-signal memory, and an output-signal memory for storing the state of the output signal generated by said arithmetic-logic unit;

wherein when there is an actuator not operating normally in said controlled system, the actuator is detected through said control apparatus, said apparatus for detecting the fault comprising:

a first determining unit for determining whether a prescribed condition for generation of an output signal to be applied to the actuator has been established;

a second determining unit for determining whether the state of said output signal is normal; and a third determining unit which, in a case where it has been determined by said first determining unit and second determining unit that the state of the output signal has not become normal even upon elaspe of a prescribed time from establishment of said prescribed condition, determines that the actuator to which this output signal is to be applied is faulty.

9. An apparatus for detecting a fault in an actuator according to claim 8, wherein said control apparatus is constituted by a programmable logic controller;

the state of said input signal corresponds to the state of a contact of the programmable logic controller; and the state of said output signal corresponds to the state of a relay of the programmable logic controller.

10. An apparatus for detecting a fault in an actuator according to claim 9, wherein said first determining unit, second determining unit and third determining unit are provided in the programmable logic controller.

11. The apparatus for detecting a fault in an actuator according to claim 8, wherein said apparatus for detecting a fault in an actuator is implemented by a computer system.

12. An apparatus for detecting a fault in an actuator and a detector through a control apparatus, which controls a controlled system including one or two or more detectors and one or two or more actuators, having an input-signal memory for storing the state of an input signal from said detector, an auxiliary input-signal memory for storing the state of an input signal provided by an auxiliary-signal generator, an arithmetic-logic unit for generating an output signal to be applied to said actuator in accordance with predetermined logic in conformity with the states of the input signals stored in said input-signal memory and auxiliary input-signal memory, and an output-signal memory for storing the state of the output signal generated by said arithmetic-logic unit;

wherein when there is an actuator not operating normally in said controlled system, the actuator is detected through said control apparatus and a detector that is possibly faulty in said controlled system and a cause of failure of the actuator is detected through said control apparatus, said apparatus for detecting the fault comprising:

a first determining unit for determining whether a prescribed condition for generation of an output signal to be aplied to the actuator has been established;

a second determining unit for determining whether the state of said output signal is normal;

a third determining unit which, in a case where it has been determined by said first determining unit and second determining unit that the state of the output signal has not become normal even upon elaspe of a prescribed time from establishment of said prescribed condition, determines that the actuator to which this output signal is to be applied is faulty;

an input-signal extractor for extracting an input signal that has influenced a logical operation, performed by said arithmetic-logic means, which gave rise to the abnormal output signal determined by said third determining unit;

a fourth determining unit for determining whether the input signal extracted by said input-signal extractor is the signal that has been stored in said input-signal memory; and a storage device which, if result of the determination by said fourth determining unit is that the extracted input signal is the signal that has been stored in the input-signal memory, stores an identification code of this input signal.

13. The apparatus for detecting a fault in an actuator and a detector according to claim 12, further comprising a display unit for displaying the identification code of the input signal that has been stored in said storage device.

14. The apparatus for detecting a fault in an actuator and a detector according to claim 12, wherein in a case where the result of determination by said fourth determining unit is that the extracted input signal is the signal that has been stored in the auxiliary input-signal memory and that it is controlled by the state of the output signal of the control apparatus, said input-signal extractor repeats extraction of the input signal that has influenced the logical operation, performed by said arithmetic-logic unit, which gave rise to the abnormal output signal that controls the state of said extracted input signal.

15. The apparatus for detecting a fault in an actuator and a detector according to claim 14, further comprising a degree-of-priority calculator which, in a case where a plurality of input signals have been extracted, calculates a degree of priority of each input signal;

said input-signal extractor ending extraction processing when the number of input signals stored in said storage device becomes larger than a predetermined prescribed number or when there are no longer any input signals to be extracted; and in a case where extraction processing by said input-signal extractor has not ended, said fourth determining unit performs the determination processing in regular order starting from the input signal for which the degree of priority is calculated to be high by said degree-of-priority calculator when a plurality of input signals have been extracted, and performs the determination processing with regard to one input signal when one input signal has been extracted.

16. The apparatus for detecting a fault in an actuator and a detector according to claim 15, wherein said degree-of-priority calculator calculates a degree of priority by obtaining features of each extracted input signal and executing fuzzy reasoning based upon these features.

17. The apparatus for detecting a fault in an actuator and a detector according to claim 12, wherein said control apparatus is a programmable logic controller;

the state of said input signal corresponds to the state of a contact of the programmable logic controller; and the state of said output signal corresponds to the state of a relay of the programmable logic controller.

18. The apparatus for detecting a fault in an actuator and a detector according to claim 17, wherein said first determining unit, said second determining unit and third determining unit are provided in the programmable logic controller.

19. The apparatus for detecting a fault in an actuator and a detector according to claim 12, wherein said apparatus for detecting a fault in an actuator and a detector is implemented by a computer system.

20. An apparatus for detecting a fault in an input signal; wherein a control apparatus, which controls a controlled system including one or two or more detectors and one or two or more actuators, has an input-signal memory for storing the state of an input signal from said detector, an auxiliary input-signal memory for storing the state of an input signal provided by an auxiliary-signal generator, an arithmetic-logic unit for generating an output signal to be applied to said actuator in accordance with predetermined logic in conformity with the states of the input signals stored in said input-signal memory and auxiliary input-signal memory, and an output-signal memory for storing the state of the output signal generated by said arithmetic-logic unit; and wherein when there is an actuator not operating normally in said controlled system, an input signal that is possibly abnormal is detected, said apparatus for detecting the fault comprising:

a designation input unit for designating an identification code of an abnormal output signal corresponding to the actuator not operating normally;

an input-signal extractor for extracting an input signal that has influenced a logical operation, performed by the arithmetic-logic unit, which gave rise to the abnormal output signal designated by said designation input unit; and a storage device for storing an identification code of the input signal extracted by said input-signal extractor.

21. The apparatus for detecting a fault in an input signal according to claim 20, further comprising a display unit for displaying the identification code of the input signal that has been stored in said storage device.

22. The apparatus for detecting a fault in an input signal according to claim 20, wherein in a case where said extracted input signal is the signal that has been stored in the auxiliary input-signal memory and is controlled by the state of the output signal of the control apparatus, said input-signal extractor repeats extraction of the input signal that has influenced the logical operation, performed by said arithmetic-logic unit, which gave rise to the abnormal output signal that controls the state of said extracted input signal.

23. The apparatus for detecting a fault in an input signal according to claim 22, further comprising a degree-of-priority calculator which, in a case where a plurality of input signals have been extracted, is for calculating a degree of priority of each input signal;

said input-signal extractor ending extraction processing when the number of input signals stored in said storage device becomes larger than a predetermined prescribed number or when there are no longer any input signals to be extracted.

24. The apparatus for detecting a fault in an input signal according to claim 23, wherein said degree-of-priority calculator calculates a degree of priority by obtaining features of each extracted input signal and executing fuzzy reasoning based upon these features.

25. The apparatus for detecting a fault in an input signal according to claim 20, wherein said apparatus for detecting a fault in an input signal is constituted by a programmable logic controller;

the state of the input signal corresponds to the state of a contact of the programmable logic controller; and the state of said output signal corresponds to the state of a relay of the programmable logic controller.

26. The apparatus for detecting a fault in an input signal according to claim 20, wherein said apparatus for detecting a fault in an input signal is implemented by a computer system.

27. A method of detecting a fault in a detector through a control apparatus, which controls a controlled system including one or two or more detectors and one or two or more actuators, having an input-signal memory for storing the state of an input signal from said detector, an auxiliary input-signal memory for storing the state of an input signal provided by an auxiliary-signal generator, an arithmetic-logic unit for generating an output signal to be applied to said actuator in accordance with predetermined logic in conformity with the states of the input signals stored in said input-signal memory and auxiliary input-signal memory, and an output-signal memory for storing the state of the output signal generated by said arithmetic-logic unit;

wherein when there is an actuator not operating normally in said controlled system, a detector that is possibly faulty in said controlled system is detected through said control apparatus, said method of detecting the fault comprising the steps of:

extracting, on the basis of a designated abnormal output signal corresponding to the actuator not operating normally, an input signal that has influenced a logical operation, performed by said arithmetic-logic unit, which gave rise to this abnormal output signal;

determining whether said extracted input signal is the signal that has been stored in said input-signal memory; and if result of said determination is that the extracted input signal is the signal that has been stored in the input-signal memory, storing an identification code of this input signal in a storage device.

28. The method of detecting a fault in a detector according to claim 27, further comprising a step of displaying the identification code of the input signal that has been stored in said storage device.

29. The method of detecting a fault in a detector according to claim 27, wherein in a case where the result of said determination is that the extracted input signal is the signal that has been stored in the auxiliary input-signal memory and that it is controlled by the state of the output signal of the control apparatus, extraction of the input signal that has influenced the logical operation, performed by said arithmetic-logic unit, which gave rise to the abnormal output signal that controls the state of said extracted input signal is repeated.

30. The method of detecting a fault in a detector according to claim 29, further comprising steps of:

calculating a degree of priority of each input signal in a case where a plurality of input signals have been extracted;

ending extraction of said input signal when the number of input signals stored in said storage device becomes larger than a predetermined prescribed number or when there are no longer any input signals to be extracted; and in a case where extraction has not ended, performing said determination in regular order starting from the input signal for which the degree of priority is calculated to be high when a plurality of input signals have been extracted, and performing said determination with regard to one input signal when one input signal has been extracted.

31. The method of detecting a fault in a detector according to claim 30, further comprising a step of calculating said degree of priority by obtaining features of each extracted input signal and executing fuzzy reasoning based upon these features.

32. The method of detecting a fault in a detector according to claim 27, wherein said control apparatus is constituted by a programmable logic controller;

the state of said input signal corresponds to the state of a contact of the programmable logic controller; and the state of the said output signal corresponds to the state of a relay of the programmable logic controller.

33. A method of detecting a fault in an actuator through a control apparatus, which controls a controlled system including one or two or more detectors and one or two or more actuators, having an input-signal memory for storing the state of an input signal from said detector, an auxiliary input-signal memory for storing the state of an input signal provided by an auxiliary-signal generator, an arithmetic-logic unit for generating an output signal to be applied to said actuator in accordance with predetermined logic in conformity with the states of the input signals stored in said input-signal memory and auxiliary input-signal memory, and an output-signal memory for storing the state of the output signal generated by said arithmetic-logic unit;

wherein when there is an actuator not operating normally in said controlled system, the actuator is detected through the control apparatus, the method of detecting the fault comprising the steps of:

performing a first determination as to whether a prescribed condition for generation of an output signal to be applied to the actuator has been established;

performing a second determination as to whether the state of said output signal is normal; and in a case where it has been determined that the state of the output signal has not become normal even upon elapse of a prescribed time from establishment of said prescribed condition, performing a third determination that the actuator to which this output signal is to be applied is faulty.

34. The method of detecting a fault in an acutator according to claim 33, wherein said control apparatus is constituted by a programmable logic controller;

the state of said input signal corresponds to the state of a contact of the programmable logic controller; and the state of said output signal corresponds to the state of a relay of the programmable logic controller.

35. The method of detecting a fault in an actuator according to claim 34, wherein the programmable logic controller performs said first, second and third determinations.

36. A method of detecting a fault in an actuator and a detector through a control apparatus, which controls a controlled system including one or two or more detectors and one or two or more actuators, having an input-signal memory for storing the state of an input signal from said detector, an auxiliary input-signal memory for storing the state of an input signal provided by an auxiliary-signal generator, an arithmetic-logic unit for generating an output signal to be applied to said actuator in accordance with predetermined logic in conformity with the states of the input signals stored in said input-signal memory and auxiliary input-signal memory, and an output-signal memory for storing the state of the output signal generated by said arithmetic-logic unit;

wherein when there is an actuator not operating normally in said controlled system, the actuator is detected through the control apparatus and a detector that is possibly faulty in the controlled system and a cause of failure of the actuator is detected through said control apparatus, the method of detecting the fault comprising the steps of:

performing a first determination as to whether a prescribed condition for generation of an output signal to be applied to the actuator has been established;

performing a second determination as to whether the state of said output signal is normal;

in a case where it has been determined that the state of the output signal has not become normal even upon elapse of a prescribed time from establishment of said prescribed condition, performing a third determination that the actuator to which this output signal is to be applied is faulty;

extracting an input signal that has influenced a logical operation, performed by said arithmetic-logic unit, which gave rise to the abnormal output signal for which said fault has been determined;

performing a fourth determination as to whether said extracted input signal is the signal that has been stored in said input-signal memory; and if result of said fourth determination is that the extracted input signal is the signal that has been stored in the input-signal memory, storing an identification code of this input signal.

37. The method of detecting a fault in an actuator and a detector according to claim 36, further comprising a step of displaying the identification code of the input signal that has been stored in said storage device.

38. The method of detecting a fault in an actuator and a detector according to claim 36, wherein in a case where the result of said fourth determination is that the extracted input signal is the signal that has been stored in the auxiliary input-signal memory and that it is controlled by the state of the output signal of the control apparatus, extraction of the input signal that has influenced the logical operation, performed by said arithmetic-logic unit, which gave rise to the abnormal output signal that controls the state of said extracted input signal is repeated.

39. The method of detecting a fault in an actuator and a detector according to claim 38, further comprising steps of calculating a degree of priority of each input signal in a ease where a plurality of input signals have been extracted;

ending extraction of said input signal when the number of input signals stored in said storage device becomes larger than a predetermined prescribed number or when there are no longer any input signals to be extracted; and in a case where extraction has not ended, performing the determination, as to whether the extracted input signal has been stored in said input-signal memory means, in regular order starting from the input signal for which the degree of priority is calculated to be high when a plurality of input signals have been extracted, and performing the determination, as to whether the extracted input signal has been stored in said input-signal memory when one input signal has been extracted.

40. The method of detecting a fault in an actuator and a detector according to claim 39, further comprising a step of calculating said degree of priority by obtaining features of each extracted input signal and executing fuzzy reasoning based upon these features.

41. The method of detecting a fault in an actuator and a detector according to claim 36, wherein said control apparatus is constituted by a programmable logic controller;

the state of said input signal corresponds to the state of a contact of the programmable logic controller; and the state of said output signal corresponds to the state of a relay of the programmable logic controller.

42. The method of detecting a fault in an actuator and a detector according to claim 41, wherein the programmable logic controller performs said first, second and third determinations.

43. A method of detecting a fault in an input signal; wherein a control apparatus, which controls a controlled system including one or two or more detectors and one or two or more actuators, having an input-signal memory for storing the state of an input signal from said detector, an auxiliary input-signal memory for storing the state of an input signal provided by an auxiliary-signal generator, an arithmetic-logic unit for generating an output signal to be applied to said actuator in accordance with predetermined logic in conformity with the states of the input signals store in said input-signal memory and auxiliary input-signal memory, and an output-signal memory for storing the state of the output signal generated by said arithmetic-logic unit; and wherein when there is an actuator not operating normally in said controlled system, an input signal that is possibly abnormal is detected, the method of detecting the fault comprising the steps of:

extracting, on the basis of a designated abnormal output signal corresponding to the actuator not operating normally, an input signal that has influenced a logical operation, performed by said arithmetic-logic unit, which gave rise to this abnormal output signal; and storing an identification code of said extracted input signal in a storage device.

44. The method of detecting a fault in an input signal according to claim 43, further comprising a step of displaying the identification code of the input signal that has been stored in said storage device.

45. A control apparatus, which is equipped with a function for detecting a fault in a detector, for controlling a controlled system including one or two or more detectors and one or two or more actuators, said control apparatus comprising:

an arithmetic-logic unit for generating an output signal to be applied to said actuator in accordance with predetermined logic in conformity with the state of an input signal from said detector and the state of an auxiliary input signal;

a designation input unit which, when there is an actuator not operating normally in said controlled system, designates an identification code of an abnormal output signal corresponding to the actuator not operating normally;

an input-signal extractor for extracting an input signal that has influenced a logical operation, performed by said arithmetic-logic unit, which gave rise to the abnormal output signal designated by said designation input unit; and a storage device which, if the input signal extracted by said input-signal extractor is from said detector, stores an identification code of this input signal.

46. The control apparatus equipped with a function for detecting a fault in a detector according to claim 45, wherein in a case where the extracted input signal is an auxiliary input signal and is controlled by the state of the output signal of the control apparatus, said input-signal extractor repeats extraction of the input signal that has influenced the logical operation, performed by said arithmetic-logic unit, which gave rise to the abnormal output signal that controls the state of said extracted input signal.

47. The control apparatus equipped with a function for detecting a fault in a detector according to claim 46, further comprising a degree-of-priority calculating means which, in a case where a plurality of input signals have been extracted, calculates a degree of priority of each input signal;

said input-signal extractor ending extraction processing when the number of input signals stored in said storage device becomes larger than a predetermined prescribed number or when there are no longer any input signals to be extracted;

wherein when a plurality of input signals have been extracted, it is determined whether the input signals are from the detector in regular order starting from the input signal for which the degree of priority is calculated to be high by said degree-of-priority calculating means; when one input signal has been extracted, it is determined whether this input signal is from the detector; and if the extracted input signal is from the detector, said storage device stores an identification code of this input signal.

48. The control apparatus equipped with a function for detecting a fault in a detector according to claim 47, wherein said degree-of-priority calculating means calculates degree of priority by obtaining features of each extracted input signal and executing fuzzy reasoning based upon these features.

49. The control apparatus equipped with a function for detecting a fault in a detector according to claim 45, wherein said control apparatus is implemented by a programmable logic controller;

the state of said input signal corresponds to the state of a contact of the programmable logic controller; and the state of said output signal corresponds to the state of a relay of the programmable logic controller.

50. The control apparatus equipped with a function for detecting a fault in a detector according to claim 45, wherein said control apparatus is implemented by a computer system;

the state of said output signal corresponds to the state of a relay of the programmable logic controller.

51. A control apparatus, which is equipped with a function for detecting a fault in an actuator and a detector, for controlling a controlled system including one or two or more detectors and one or two or more actuators, said control apparatus comprising:

an arithmetic-logic unit for generating an output signal to be applied to said actuator in accordance with predetermined logic in conformity with the state of an input signal from said detector and the state of an auxiliary input signal;

a determining unit which, when there is an actuator not operating normally in said controlled system, determines that the actuator to which the output signal is to be applied is faulty in a case where the state of the output signal has not become normal even upon elapse of a prescribed time from establishment of a condition for generation of an output signal to be applied to the actuator;

an input-signal extractor for extracting an input signal that has influenced a logical operation, performed by said arithmetic-logic unit, which gave rise to an abnormal output signal determined by said determining unit; and a storage device which, if the input signal extracted by said input-signal extractor is from said detector, stores an identification code of this input signal.

52. The control apparatus equipped with a function for detecting a fault in an actuator and a detector according to claim 51, wherein in a case where the extracted input signal is an auxiliary input signal and is controlled by the state of the output signal of the control apparatus, said input-signal extractor repeats extraction of the input signal that has influenced the logical operation, performed by said arithmetic-logic unit, which gave rise to the abnormal output signal that controls the state of said extracted input signal.

53. The control apparatus equipped with a function for detecting a fault in an actuator and a detector according to claim 52, further comprising a degree-of-priority calculating means which, in a case where a plurality of input signals have been extracted, calculates a degree of priority of each input signal;

said input-signal extractor ending extraction processing when the number of input signals stored in said storage device becomes larger than a predetermined prescribed number or when there are no longer any input signals to be extracted;

wherein when a plurality of input signals have been extracted, it is determined whether the input signals are from the detector in regular order starting from the input signal for which the degree of priority is calculated to be high by said degree-of-priority calculating means; when one input signal has been extracted, it is determined whether this input signal is from the detector; and if the extracted input signal is from the detector, said storage device stores an identification code of this input signal.

54. The control apparatus equipped with a function for detecting a fault in an actuator and a detector according to claim 53, wherein said degree-of-priority calculating means calculates degree of priority by obtaining features of each extracted input signal and executing fuzzy reasoning based upon these features.

55. The control apparatus equipped with a function for detecting a fault in an actuator and a detector according to claim 51, wherein said control apparatus is constituted by a programmable logic controller;

the state of said input signal corresponds to the state of a contact of the programmable logic controller; and the state of said output signal corresponds to the state of a relay of the programmable logic controller.

56. The control apparatus equipped with a function for detecting a fault in an actuator and a detector according to claim 51, wherein said control apparatus is implemented by a computer system.

57. A control apparatus, which is equipped with a function for detecting a fault in an input signal, for controlling a controlled system including one or two or more detectors and one or two or more actuators, said control apparatus comprising:

an arithmetic-logic unit for generating an output signal to be applied to said actuator in accordance with predetermined logic in conformity with the state of an input signal from said detector and the state of an auxiliary input signal;

a designation input unit which, when there is an actuator not operating normally in said controlled system, designates an identification code of an abnormal output signal corresponding to the actuator not operating normally;

an input-signal extractor for extracting an input signal that has influenced a logical operation, performed by said arithmetic-logic unit, which gave rise to the abnormal output signal designated by said designation input unit; and a storage device for storing an identification code of the input signal extracted by said input-signal extractor.

58. The control apparatus equipped with a function for detecting a fault in an input signal according to claim 57, wherein in a case where the extracted input signal is an auxiliary input signal and is controlled by the state of the output signal of the control apparatus, said input-signal extractor repeats extraction of the input signal that has influenced the logical operation, performed by said arithmetic-logic unit, which gave rise to the abnormal output signal that controls the state of said extracted input signal.

59. The control apparatus equipped with a function for detecting a fault in an input signal according to claim 58, further comprising a degree-of-priority calculating means which, in a case where a plurality of input signals have been extracted, calculates a degree of priority of each input signal;

said input-signal extractor ending extraction processing when the number of input signals stored in said storage device becomes larger than a predetermined prescribed number or when there are no longer any input signals to be extracted.

60. The control apparatus equipped with a function for detecting a fault in an input signal according to claim 59, wherein said degree-of-priority calculating means calculates degree of priority by obtaining features of each extracted input signal and executing fuzzy reasoning based upon these features.

61. The control apparatus equipped with a function for detecting a fault in a detector according to claim 57, wherein said control apparatus is constituted by a programmable logic controller;

the state of said input signal corresponds to the state of a contact of the programmable logic controller; and the state of said output signal corresponds to the state of a relay of the programmable logic controller.

62. The control apparatus equipped with a function for detecting a fault in an input signal according to claim 57, wherein said control apparatus is implemented by a computer system.

63. A control method for detecting a fault in a detector, said control method controlling a controlled system including one or two or more detectors and one or two or more actuators, said control method comprising the steps of:

generating an output signal to be applied to said actuator in accordance with predetermined logic in conformity with the state of an auxiliary input signal;

when there is an actuator not operating normally in said controlled system, extracting, on the basis of a designated abnormal output signal corresponding to the actuator not operating normally, an input signal that has influenced said logical operation, which gave rise to this abnormal output signal; and in a case whets said extracted input signal is from said detector, storing an identification code of this input signal in a storage device.

64. A control method for detecting a fault in an actuator and a detector, said control method controlling a controlled system including one or two or more detectors and one or two or more actuators, said control method comprising the steps of:

generating an output signal to be applied to said actuator in accordance with predetermined logic in conformity with the state of an input signal from said detector and the state of an auxiliary input signal;

when there is an actuator not operating normally in said controlled system, determining that the actuator to which the output signal is to be applied is faulty in a case where the state of the output signal has not become normal even upon elapse of a prescribed time from establishment of a condition for generation of an output signal to be applied to the actuator;

extracting an input signal that has influenced said logical operation, which gave rise to said determined abnormal output signal; and in a case where said extracted input signal is from said detector, storing an identification code of this input signal in a storage device.

65. A control method for detecting a fault in an input signal, said control method controlling a controlled system including one or two or more detectors and one or two or more actuators, said control method comprising the steps of:

generating an output signal to be applied to said actuator in accordance with predetermined logic in conformity with the state of an input signal from said detector and the state of an auxiliary input signal;.

when there is an actuator not operating normally in said controlled system, extracting, on the basis of a designated abnormal output signal corresponding to the actuator not operating normally, an input signal that has influenced said logical operation, which gave rise to this abnormal output signal; and storing an identification code of said extracted input signal in a storage device.

66. A programmable logic controller, which is equipped with a function for detecting a fault in a detector, for controlling a controlled system including one or two or more detectors and one or two ore more actuators, said controller comprising:

an arithmetic-logic unit for generating an output signal to be applied to said actuator in accordance with predetermined logic in conformity with the state of an input signal from said conformity with the state of an input signal from said detector and the state of an auxiliary input signal;

a designation input unit which, when there is an actuator not operating normally in said control led system, designates an identification code of an abnormal output signal corresponding to the actuator not operating normally;

an input-signal extractor for extracting an input signal that has influenced a logical operation, performed by said arithmetic-logic unit, which gave rise to the abnormal output signal designated by said designation input unit; and a storage device which, if the input signal extracted by said input-signal extractor is from said detector, stores an identification code of this input signal.

67. A computer system, which is equipped with a function for detecting a fault in a detector, for controlling a controlled system including one or two or more detectors and one or two or more actuators, said computer system comprising:

an arithmetic-logic unit for generating an output signal to be applied to said actuator in accordance with predetermined logic in conformity with the state of an input signal from said detector and the state of an auxiliary input signal;

a designation input unit which, when there is an actuator not operating normally in said controlled system, designates an identification code of an abnormal output signal corresponding to the actuator not operating normally;

an input-signal extractor for extracting an input signal that has influenced a logical operation, performed by said arithmetic-logic unit, which gave rise to the abnormal output signal designated by said designation input unit; and a storage device which, if the input signal extracted by said input-signal extractor is from said detector, stores an identification code of this input signal.

68. A programmable logic controller, which is equipped with a function for detecting a fault in an actuator and a detector, for controlling a controlled system including one or two or more detectors and one or two or more actuators, said controller comprising;

an arithmetic-logic unit for generating an output signal to be applied to said actuator in accordance with predetermined logic in conformity with the state of an input signal from said detector and the state of an auxiliary input signal;

a determining unit which, when there is an actuator not operating normally in said controlled system, determines that the actuator to which the output signal is to be applied is faulty in a case where the state of the output signal has not become normal even upon elapse of a prescribed time from establishment of a condition for generation of an output signal to be applied to the actuator;

an input-signal extractor for extracting an input signal that has influenced a logical operation, performed by said arithmetic-logic unit, which gave rise to an abnormal output signal determined by said determining unit; and a storage device which, if the input signal extracted by said input-signal extractor is from said detector, stores an identification code of this input signal.

69. A computer system, which is equipped with a function for detecting a fault in an actuator and a detector, for controlling a controlled system including one or two or more detectors and one or two or more actuators, said computer system comprising:

an arithmetic-logic unit for generating an output signal to be applied to said actuator in accordance with predetermined logic in conformity with the state of an input signal from said detector and the state of an auxiliary input signal;

a determining unit which, when there is an actuator not operating normally in said controlled system, determines that the actuator to which the output signal is to be applied is faulty in a case where the state of the output signal has not become normal even upon elapse of a prescribed time from establishment of a condition for generation of an output signal to be applied to the actuator;

an input-signal extractor for extracting an input signal that has influenced a logical operation, performed by said arithmetic-logic unit, which gave rise to an abnormal output signal determined by said determining unit; and a storage device which, if the input signal extracted by said input-signal extracting means is from said detector, stores an identification code of this input signal.

70. A programmable logic controller, which is equipped with a function for detecting a fault in an input signal, for controlling a controlled system including one or two or more detectors and one or two or more actuators, said controller comprising:

an arithmetic-logic unit for generating an output signal to be applied to said actuator in accordance with predetermined logic in conformity with the state of an input signal from said detector and the state of an auxiliary input signal;

a designation input unit which, when there is an actuator not operating normally in said controlled system, designates an identification code of an abnormal output signal corresponding to the actuator not operating normally;

an input-signal extractor for extracting an input signal that has influenced a logical operation, performed by said arithmetic-logic unit, which gave rise to the abnormal output signal designated by said designation input unit; and a storage device for storing an identification code of the input signal extracted by said input-signal extractor.

71. A computer system, which is equipped with a function for detecting a fault in an input signal, for controlling a controlled system including one or two or more detectors and one or two or more actuators, said computer system comprising:

an arithmetic-logic unit for generating an output signal to be applied to said actuator in accordance with predetermined logic in conformity with the state of an input signal from said detector and the state of an auxiliary input signal;

a designation input unit which, when there is an actuator not operating normally in said controlled system, designates an identification code of an abnormal output signal corresponding to the actuator not operating normally;

an input-signal extractor for extracting an input signal that has influenced a logical operation, performed by said arithmetic-logic unit, which gave rise to an abnormal output signal designated by said designation input unit; and a storage device for storing an identification code of the input signal extracted by said input-signal extractor.

* * * * *